(12) United States Patent
Zhu et al.

(10) Patent No.: US 10,870,749 B2
(45) Date of Patent: Dec. 22, 2020

(54) THERMALLY CONDUCTIVE POLYMERS AND METHODS FOR MAKING

(71) Applicants: Jiahua Zhu, Fairlawn, OH (US); Nitin Mehra, Akron, OH (US); Liwen Mu, Akron, OH (US)

(72) Inventors: Jiahua Zhu, Fairlawn, OH (US); Nitin Mehra, Akron, OH (US); Liwen Mu, Akron, OH (US)

(73) Assignee: The University of Akron, Akron, OH (US)

( * ) Notice: Subject to any disclaimer, the term of this patent is extended or adjusted under 35 U.S.C. 154(b) by 117 days.

(21) Appl. No.: 16/027,736

(22) Filed: Jul. 5, 2018

(65) Prior Publication Data

US 2019/0010322 A1  Jan. 10, 2019

Related U.S. Application Data

(60) Provisional application No. 62/528,559, filed on Jul. 5, 2017.

(51) Int. Cl.
*C08L 29/04* (2006.01)
*C08L 97/00* (2006.01)
(Continued)

(52) U.S. Cl.
CPC .............. *C08L 29/04* (2013.01); *C08J 3/215* (2013.01); *C08J 5/18* (2013.01); *C08K 5/053* (2013.01); *C08K 5/175* (2013.01); *C08L 89/06* (2013.01); *C08L 97/005* (2013.01); *C08J 2329/04* (2013.01); *C08L 2203/16* (2013.01)

(58) Field of Classification Search
CPC .... C08L 29/04; C08L 97/005; C08L 2203/16; C08L 89/06; C08K 5/053; C08K 5/175
See application file for complete search history.

(56) References Cited

U.S. PATENT DOCUMENTS 6,311,769 B1  11/2001  Bonneville et al.
7,321,107 B2  1/2008  Yagnik et al.
(Continued)

FOREIGN PATENT DOCUMENTS

CN  105542728 A  5/2016
EP  186689 B1  1/2005
(Continued)

OTHER PUBLICATIONS

Xu, S., Liu, H., Li, Q., Mu, Q. & Wen, H. Influence of magnetic alignment and layered structure of BN&Fe/EP on thermal conducting performance. Journal of Materials Chemistry C 4, 872-878 (2016).

(Continued)

*Primary Examiner* — Robert D Harlan
(74) *Attorney, Agent, or Firm* — Renner Kenner Greive Bobak Taylor and Weber

(57) ABSTRACT

A process is provided for preparing a thermally conductive polymer composite. The method includes the steps of combining a linear, hydrophilic polymer and an organic, hydrophilic additive to form a blend. The additive includes at least two polar functional groups that are capable of forming hydrogen bonds. A thermally conductive polymer is also provided.

9 Claims, 18 Drawing Sheets
(18 of 18 Drawing Sheet(s) Filed in Color)

(51) Int. Cl.
*C08L 89/06* (2006.01)
*C08K 5/053* (2006.01)
*C08K 5/17* (2006.01)
*C08J 3/215* (2006.01)
*C08J 5/18* (2006.01)

(56) References Cited

U.S. PATENT DOCUMENTS

| | | |
|---|---|---|
| 2004/0116571 A1 | 6/2004 | Su |
| 2011/0073799 A1 | 3/2011 | Magni |
| 2012/0153217 A1* | 6/2012 | Saga .................. C08K 3/22 252/75 |
| 2015/0259589 A1 | 9/2015 | Takagi et al. |

FOREIGN PATENT DOCUMENTS

| | | |
|---|---|---|
| EP | 2819158 A3 | 4/2015 |
| WO | 2016057418 A1 | 4/2016 |
| WO | 2016120760 A1 | 8/2016 |

OTHER PUBLICATIONS

Marconnet, A. M., Yamamoto, N., Panzer, M. A., Wardle, B. L. & Goodson, K. E. Thermal Conduction in Aligned Carbon Nanotube-Polymer Nanocomposites with High Packing Density. ACS Nano 5, 4818-4825 (2011).

Zweben, C. Advances in composite materials for thermal management in electronic packaging. Jom-J Min Met Mat S 50, 47-51 (1998).

Alippi, C. A unique timely moment for embedding intelligence in applications. CAAI Transactions on Intelligence Technology 1, 1-3 (2016).

Guan, X. et al. Carbon Nanotubes-Adsorbed Electrospun PA66 Nanofiber Bundles with Improved Conductivity and Robust Flexibility. ACS Appl Mater Interfaces 8, 14150-14159, doi:10.1021/acsami.6b02888 (2016).

Jin, H., Chen, Q., Chen, Z., Hu, Y. & Zhang, J. Multi-LeapMotion sensor based demonstration for robotic refine tabletop object manipulation task. CAAI Transactions on Intelligence Technology 1, 104-113, (2016).

Liu, H. et al. Lightweight conductive graphene/thermoplastic polyurethane foams with ultrahigh compressibility for piezoresistive sensing. Journal of Materials Chemistry C 5, 73-83 (2017).

Zhao, W. et al. Ultra-high thermally conductive and rapid heat responsive poly(benzobisoxazole) nanocomposites with self-aligned graphene. Nanoscale 8, 19984-19993 (2016).

Kim, G.-H. et al. High thermal conductivity in amorphous polymer blends by engineered interchain interactions. Nature materials 14, 295-300 (2015).

Xie, X. et al. Thermal Conductivity, Heat Capacity, and Elastic Constants of Water-Soluble Polymers and Polymer Blends. Macromolecules 49, 972-978 (2016).

Inamura, I. Liquid-Liquid Phase Separation and Gelation in the Poly(vinyl alcohol)-Poly(ethylene glycol)-Water System. Dependence on Molecular Weight of Poly(ethylene glycol). Polym J 18, 269-272 (1986).

Mu, L. et al. Paving the Thermal Highway with Self-Organized Nanocrystals in Transparent Polymer Composites. Acs Appl Mater Inter 8, 29080-29087 (2016).

Wei, H. et al. Advanced micro/nanocapsules for self-healing smart anticorrosion coatings. Journal of Materials Chemistry A 3, 469-480 (2015).

Felby, C., Hassingboe, J. & Lund, M. Pilot-scale production of fiberboards made by laccase oxidized wood fibers: board properties and evidence for cross-linking of lignin. Enzyme and Microbial Technology 31, 736-741 (2002).

Wang, X. Ho, V., Segalman, R. A. & Cahill, D. G. Thermal Conductivity of High-Modulus Polymer Fibers. Macromolecules 46, 4937-4943 (2013).

Abdel-Ati, M. I., Hemeda, O. M., Mosaad, M. M. & Hemeda, D. M. Thermal properties of pure and doped (polyvinyl-alcohol) PVA. J. Therm. Anal. 42, 1113-1122 (1994).

Mu, L. et al. Expedited Phonon Transfer in Interfacially Constrained Polymer Chain along Self-Organized Amino Acid Crystals. Acs Appl. Mater Inter 9(13): 12138-12145 (2017).

Mehra, N. et al. Developing heat conduction pathways through short polymer chains in a hydrogen bonded polymer system. Composites Science and Technology 148: 97-105 (2017).

Mu, L. et al. The Molecular Origin of Efficient Phonon Transfer in Modulated Polymer Blends: Effect of Hydrogen Bonding on Polymer Coil Size and Assembled Microstructure. The Journal of Physical Chemistry C, DOI: 10.1021/acs.jpcc 7b03726 (2017).

* cited by examiner

THERMALLY CONDUCTIVE POLYMERS AND METHODS FOR MAKING

CROSS-REFERENCE TO RELATED APPLICATIONS

This application claims the benefit of U.S. Provisional Patent Application Nos. 62/528,559, filed Jul. 5, 2017, which is incorporated herein by reference.

STATEMENT REGARDING FEDERALLY SPONSORED RESEARCH OF DEVELOPMENT

This invention was made with government support under contract number CBET-1603264 awarded by the National Science Foundation. The government has certain rights in the invention.

FIELD OF THE INVENTION

The present invention generally resides in the field of thermally conductive polymers and methods of making thermally conductive polymers.

BACKGROUND OF THE INVENTION

With the increasing demand of fast and efficient computing, the development of high performance processors is a great necessity. High performance on micro-processor means high transistor density which comes with the cost of high heat generation. This adversity effects the lifetime and performance of the processor and additionally may lead to high cooling cost. Thermal management is critical for the development of high performance processors and transistors. The growing trend in electronics packaging has been to reduce size and increase performance. The presence of all the desired features in a small package mandates that thermal management be given prime priority to increase system performance and reliability in power electronics. Development of a thermal conductive material that also has electrical insulating properties is needed to address this problem. The number of applications of these products can range from electronics to energy to automobiles to aerospace. Everywhere there is heat management or storage needs the material of this kind can improve life time reliability and enhanced performance of system. These materials are in great demand in the field of manufacturing or fabrication of microprocessor, chips on board, semiconductor etc. But application of such material can be as vast as heat exchangers, aerospace, automobiles etc. Global thermal Management technology market is USD 11.7 Billion (2015). Out of this thermal interface materials based on polymer composite is currently estimated around USD 667.5 million. Computer industry accounts for around 60% of total shares for these materials. (BCC Market Report).

High thermally conductive fillers have been used to develop thermally conductive polymer based composites. However, filler-based composites suffer from wide variety of problems especially related to fabrication, high-cost, poor mechanical properties, etc. Almost all thermal conductive plastics are based on ceramic/metallic filler-resin combination with high filler loading from 30 to 80%. The general rule of these traditional technologies is higher the loading, the higher the thermal conductivity. High filler loading degrades mechanical properties, making plastic brittle, increasing weight, complicating the fabrication process at the same time adding cost due to expensive ceramic/carbon/metallic fillers. There is a need for a filler-free, thermally conductive polymer composite for thermal management applications.

SUMMARY OF THE INVENTION

Embodiments of the present invention provide a thermally conductive polymer composite comprising a blend of (a) a linear, hydrophilic polymer and (b) an organic, hydrophilic additive that includes at least two polar functional groups that are capable of forming hydrogen bonds.

Embodiments of the present invention further provide a process for preparing a thermally conductive polymer composite, the method comprising the steps of combining a linear, hydrophilic polymer and an organic, hydrophilic additive that includes at least two polar functional groups that are capable of forming hydrogen bonds, and blending to form a thermally conductive polymer composite. The functional groups may be the same or different.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

tensile strength and (e) elongation at break of different composites. HT means the samples after heat treatment at 120° C. for 5 hours.

Figure 10:
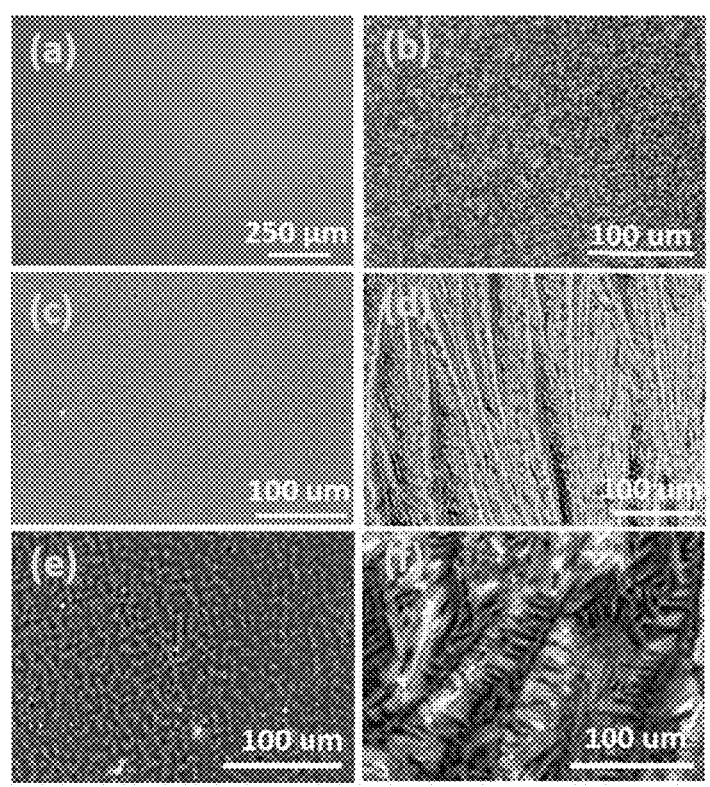

FIG. 10 provides optical photos of PVA and amino acid films: Cysteine (Cys), Lysine (Lys), Glutamic acid (Glu), Ornithine (Ori), Aspartic acid (Asp)-(a) PVA, (b) PVA/Cys, (c) PVA/Lys, (d) PVA/Glu, (e) PVA/Ori, (f) PVA/Asp.

Figure 11:
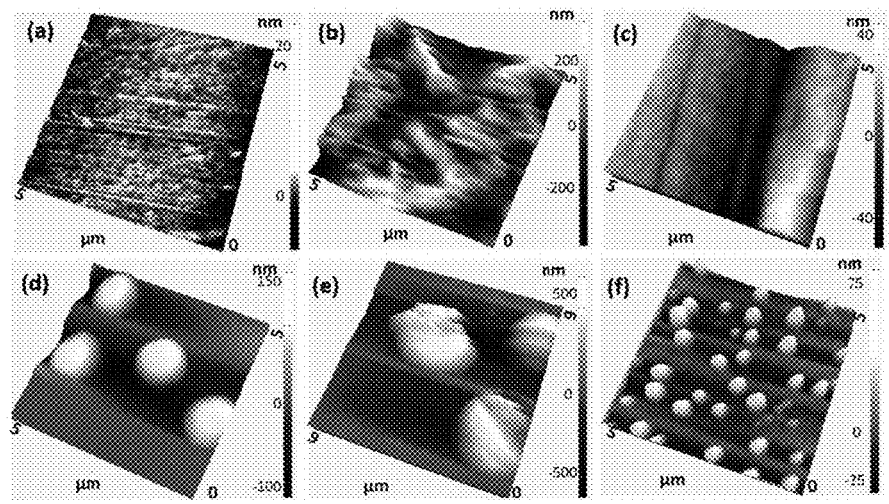

FIG. 11 provides AFM three-dimensional topography of (a) PVA, (b) PVA/Cys, (c) PVA/Lys, (d) PVA/Glu, (e) PVA/Ori and (f) PVA/Asp.

Figure 12:
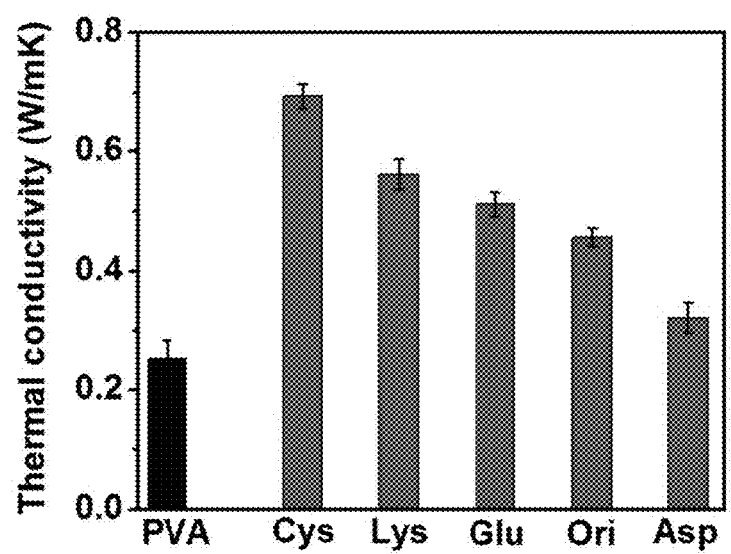

FIG. 12 provides thermal conductivity of pure PVA and PVA/AA composites.

Figure 13:
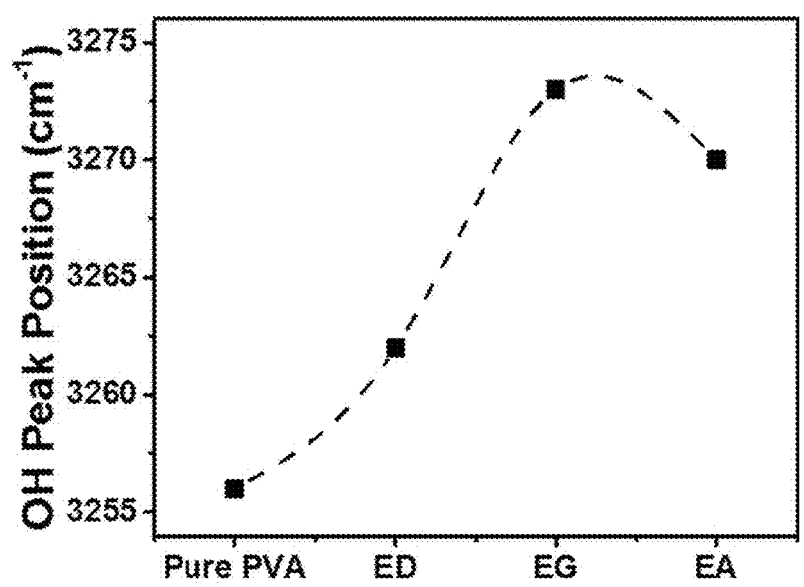

FIG. 13 illustrates shift in OH peak position in PVA-organic additive composite films.

Figure 14:
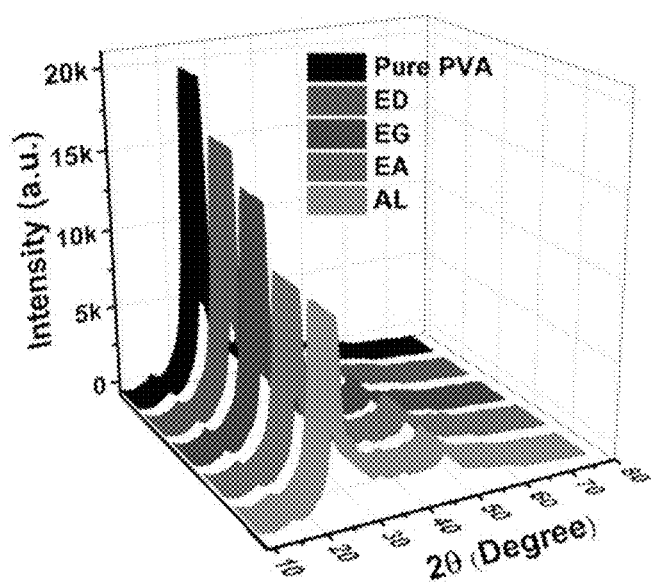

FIG. 14 illustrates XRD of pure PVA and PVA-organic additive composite films.

Figure 15:
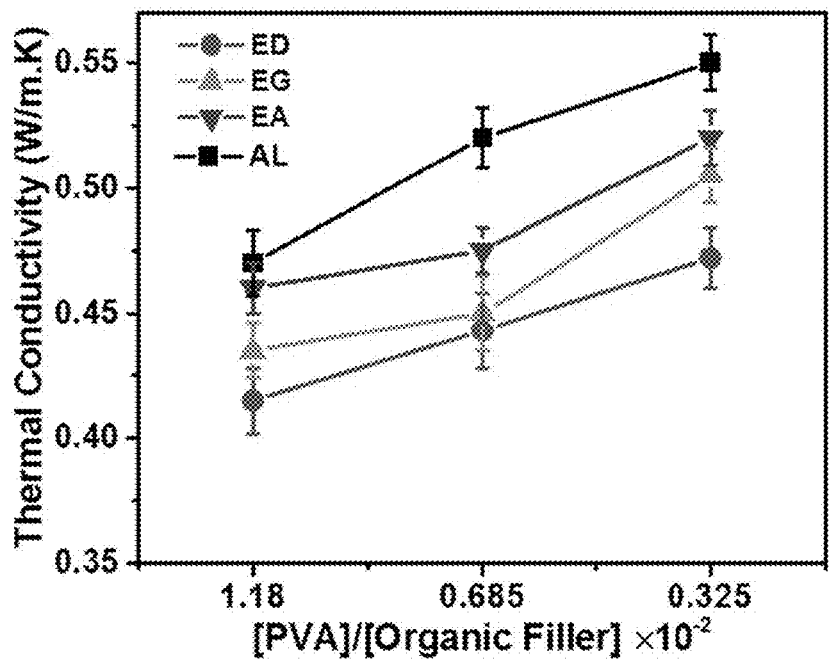

FIG. 15 illustrates Thermal conductivity PVA-organic additive composite films at various molar ratios.

Figure 16:
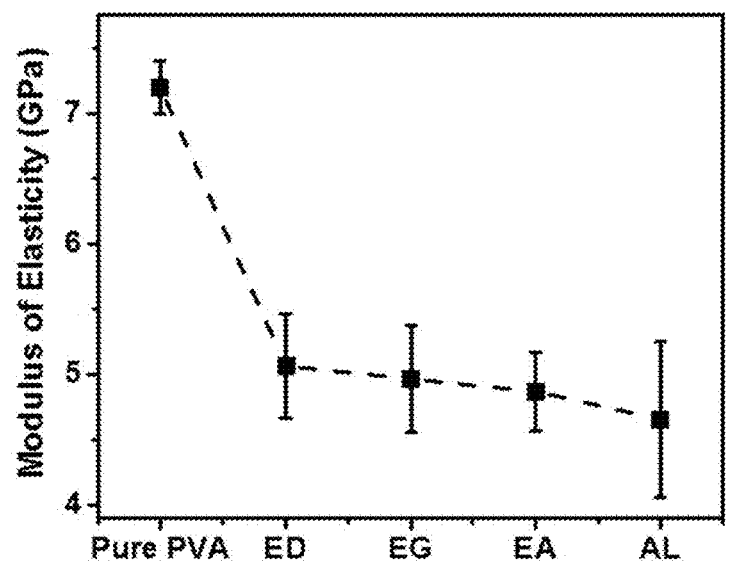

FIG. 16 illustrates Modulus of Elasticity of Pure PVA and PVA-organic additive composite films.

Figure 17:
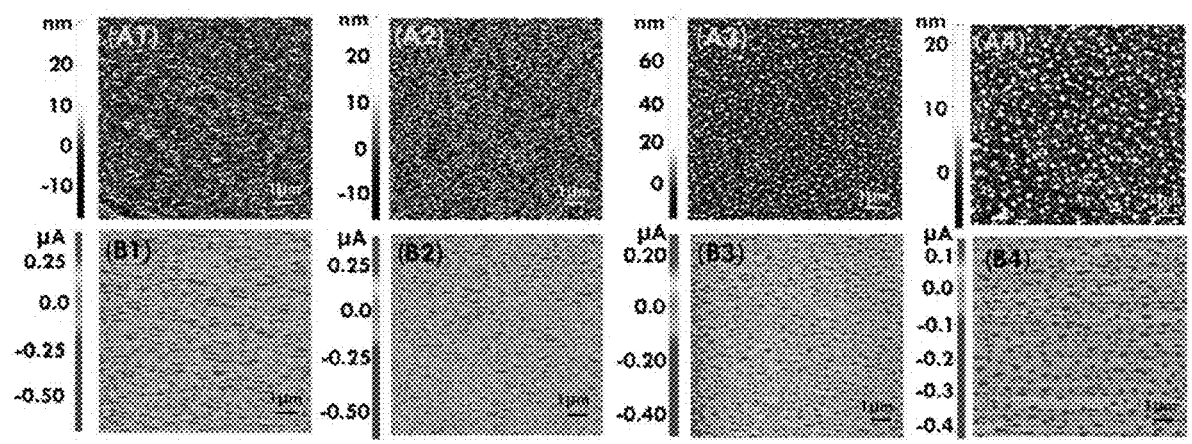

FIG. 17 provides topography (A1-A4) and Thermal Scanning Microscope (B1-B4) images of PVA-organic additive composites of ethylenediamine (ED), ethylene glycol (EG), ethanolamine (EA), β-alanine (AL) respectively.

Figure 18:
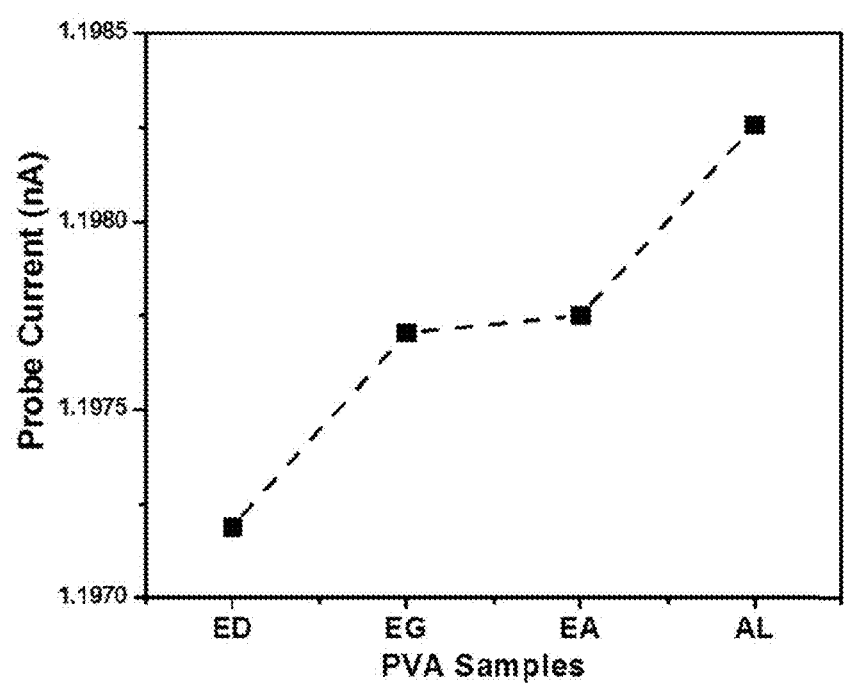

FIG. 18 illustrates average probe current from Scanning Thermal Microscopy for PVA-organic additive composites of ED, EG, EA and AL.

Figure 19:
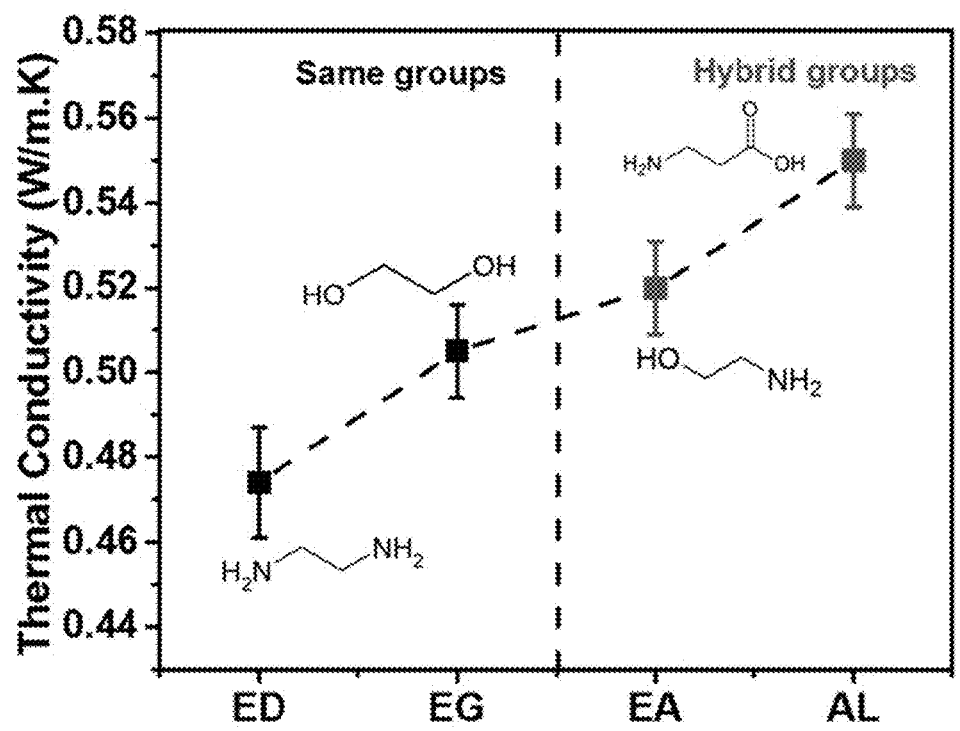

FIG. 19 provides summarized thermal conductivity of PVA-organic additive composites of ED, EG, EA and AL.

Figure 20:
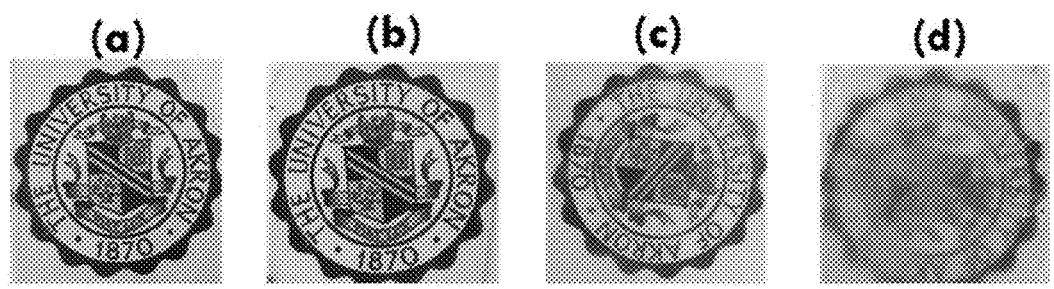

FIG. 20 provides optical images of PVA-organic additive composite films with organic additives (a) ED, (b) EG, (c) EA and (d) AL.

Figure 21:
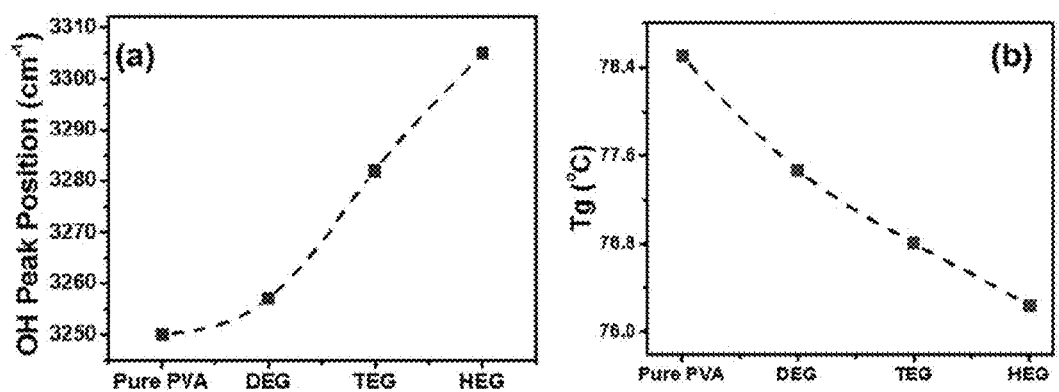

FIG. 21 illustrates (a) OH Peak shift (b) Glass transition temperature of PVA-organic additive composite films where the organic additive is diethylene glycol (DEG), tetraethylene glycol (TEG) and hexaethylene glycol (HEG) at PVA-organic additive molar ratio of 3.25×10-3.

Figure 22:
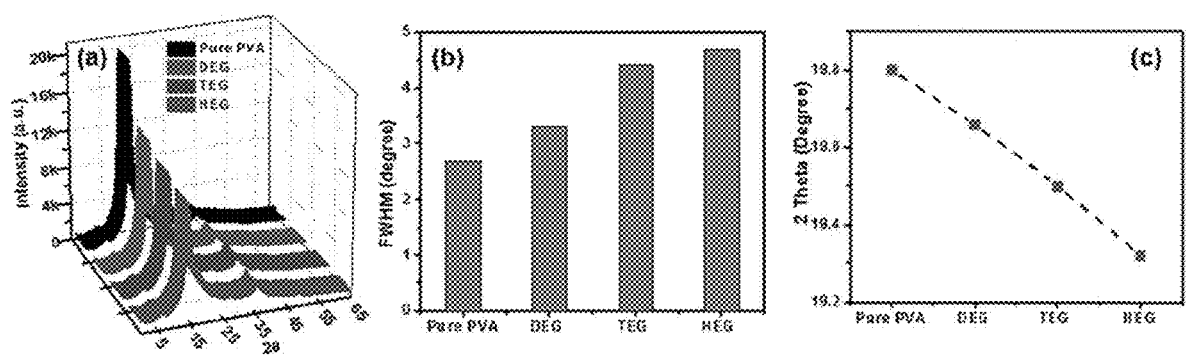

FIG. 22 illustrates (a)XRD (b) FWHM (c) 2θ at characteristic peak of pure PVA and DEG, TEG and HEG composite films at molar ratio of 3.25×10-3.

Figure 23:
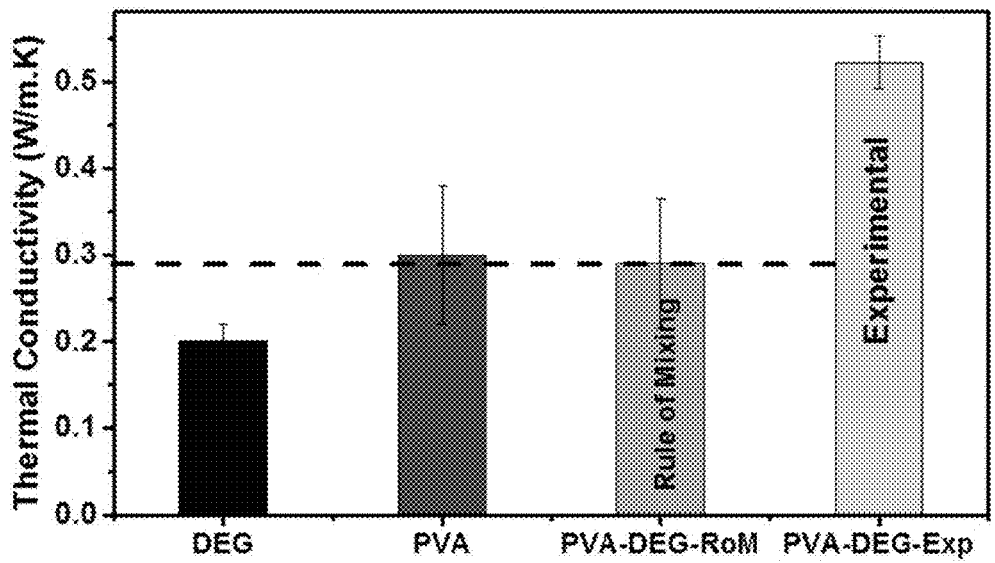

FIG. 23 illustrates Thermal Conductivity of pure PVA and composite sample of PVA-DEG at 16 wt. % loading. Thermal conductivity of DEG taken from T. Sun, A. S. Teja, "Density, Viscosity, and Thermal Conductivity of Aqueous Ethylene, Diethylene, and Triethylene Glycol Mixtures between 290 K and 450 K", J. Chem. Eng. Data, 48(2003), pp. 198-202.

Figure 24:
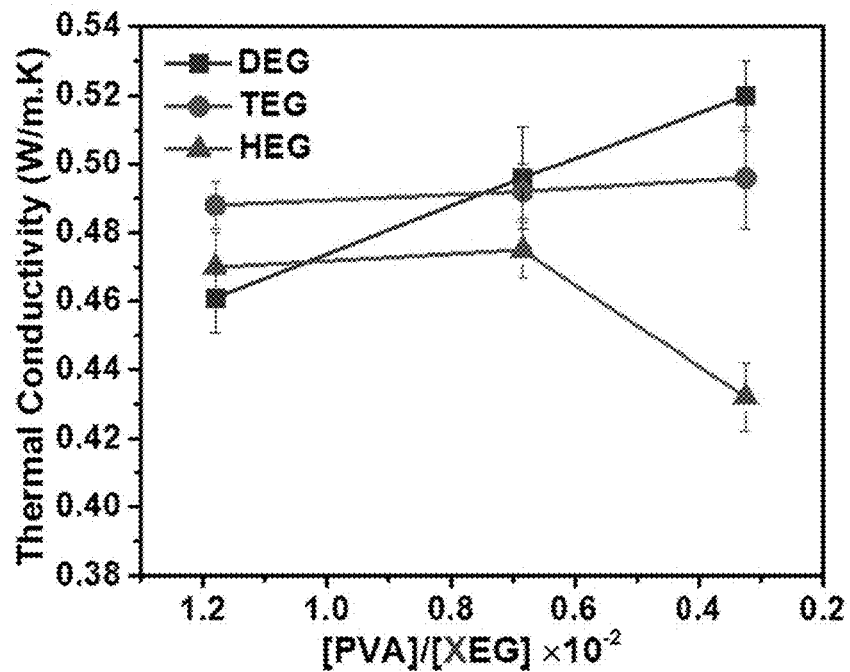

FIG. 24 illustrates Thermal Conductivity of PVA-organic additive composite films with different molar ratios of PVA to XEG, where XEG is DEG, TEG or HEG.

Figure 25:
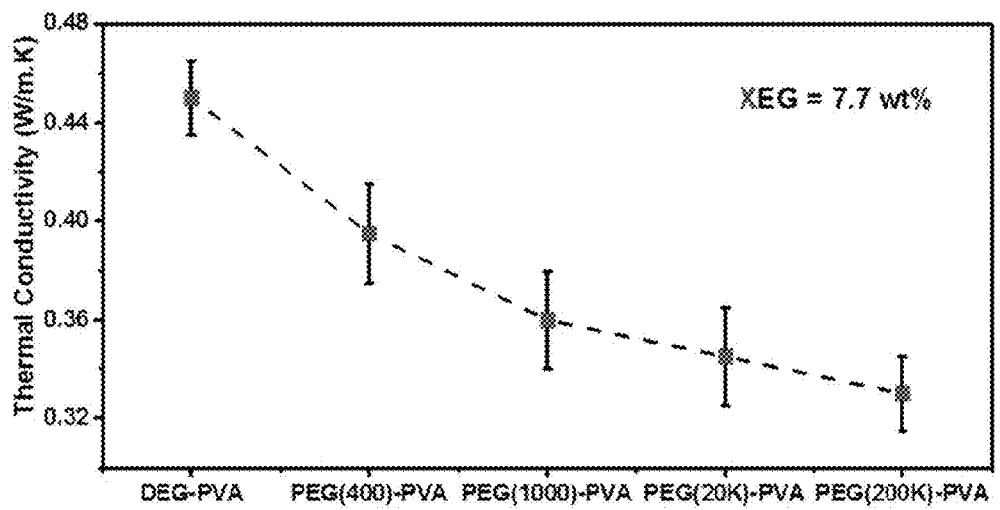

FIG. 25 illustrates Thermal conductivity of PVA-organic additive composite films with decreasing molecular weight of bridging chain. All samples were prepared with XEG loading of 7.7 wt. %.

Figure 26:
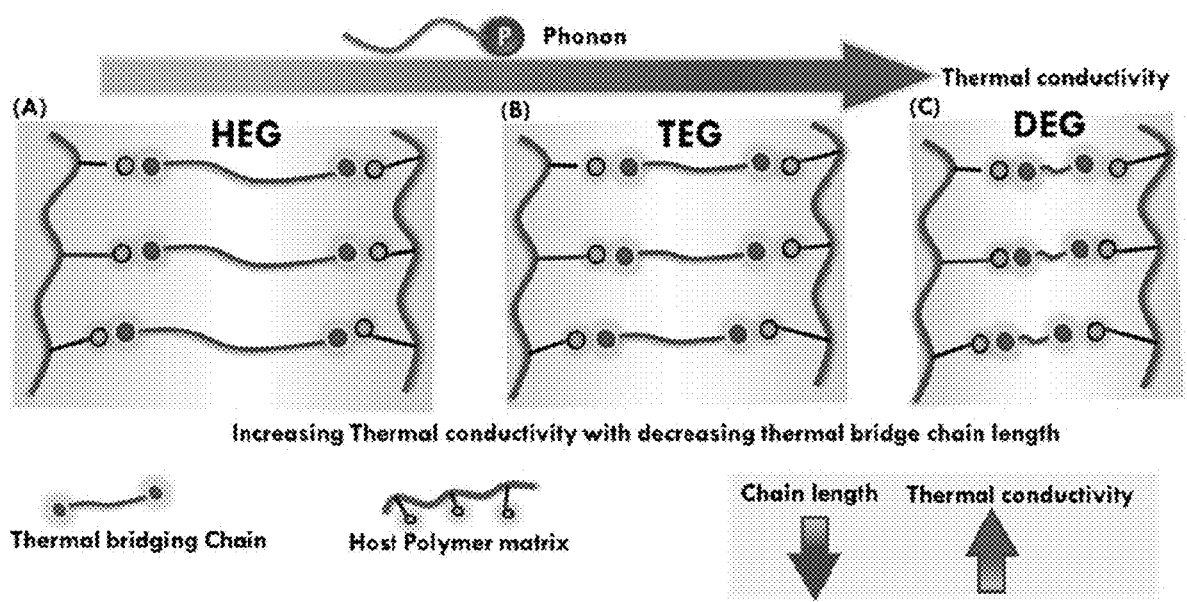

FIG. 26 illustrates Scheme of thermal bridging chain length on the thermal conductivity of PVA-organic additive composite films for XEG, HEG, TEG, DEG.

Figure 27:
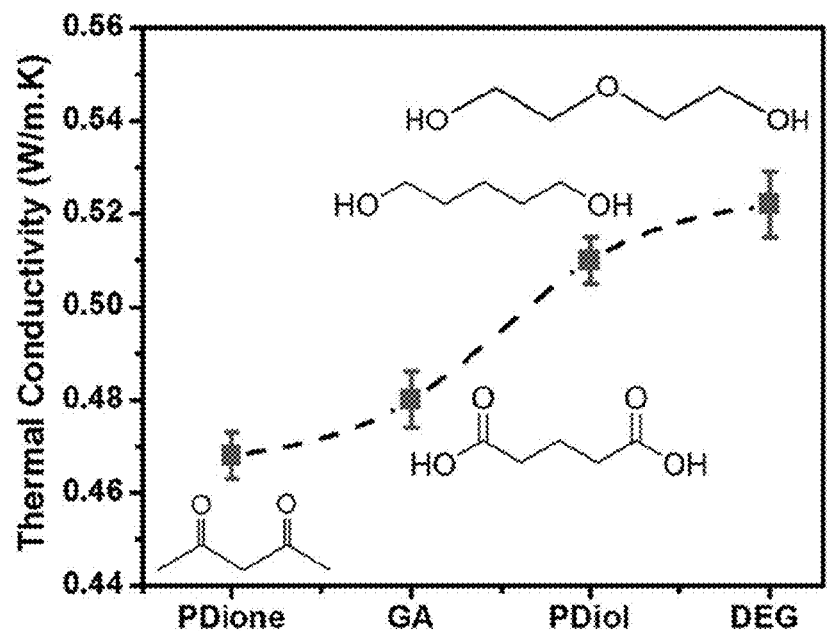

FIG. 27 illustrates Thermal conductivity of composite films at PVA-Organic molecules molar ratio of 3.25×10-3 with different functional groups at terminal position.

Figure 28:
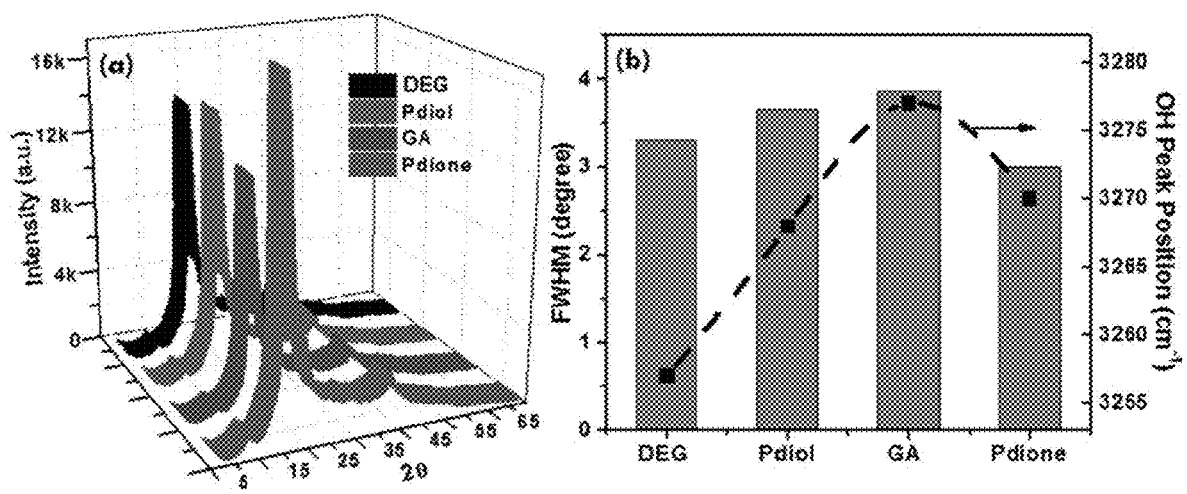

FIG. 28 provides (a) XRD and (b) FWHM and OH peak shift of different PVA composites film at 3.25×10-3 molar ratio having different functional groups at terminal position.

Figure 29:
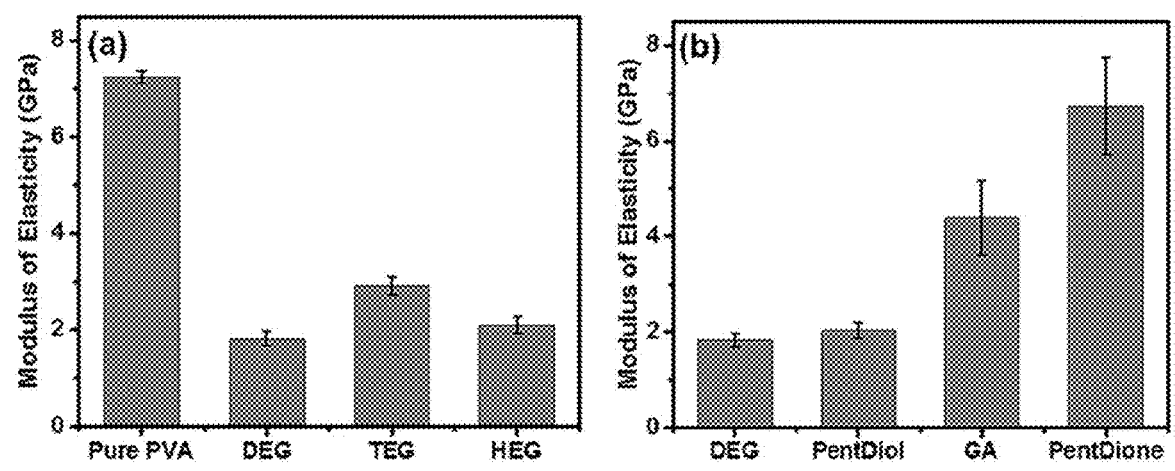

FIG. 29 illustrates Modulus of elasticity of all PVA composites films at PVA-organic molecule molar ratio of 3.25×10-3.

Figure 30:
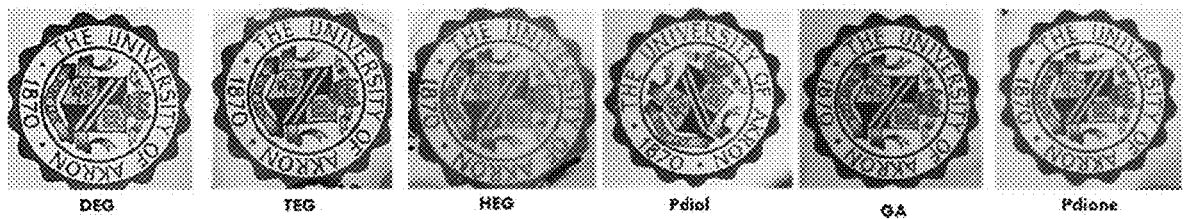

FIG. 30 provides Optical images of all PVA composite films at molar ratio of 3.25×10-3.

DETAILED DESCRIPTION OF ILLUSTRATIVE EMBODIMENTS

Advantageously, the present invention provides a polymer composite that is thermally conductive and electrically insulating for thermal management applications, without the need for any ceramic, carbon, or metallic filler. In fact, the inventors have coined the following phrase to describe this novel technology: "Filler Free Technology for Thermally Conductive Polymers (FFT-TCP)". FFT-TCP polymeric materials of the present invention are engineered on a molecular level to develop heat conduction pathways within the polymer chains. In one or more embodiments, FFT-TCP materials of the present invention are light weight, optically transparent, mechanically flexible and robust, easily fabricated, cost-effective, bio-degradable, and/or corrosion resistant.

The polymer composite includes a blend of a linear, hydrophilic polymer and an organic, hydrophilic additive. In one or more embodiments, the additive interacts with the polymer via hydrogen bonding, and forms an arrangement of molecules that enhances thermal conduction. In one or more embodiments, the additive acts as a crystal precursor leading to self-ordered crystallization. Crystal pathways along with intermolecular interactions facilitate thermal conduction within and/or along the polymer chains. Thermal transport is enhanced and optical transparency is improved. In contrast, polymer composites that are filler-based tend to be opaque and additionally can have fabrication issues or undesired mechanical properties.

Linear Hydrophilic Polymer

In one or more embodiments, the polymer composite includes at least one linear, hydrophilic polymer. By linear is meant polymers in which monomeric units are linked together to form linear chains. There may be some branching, but in general, the level of branching in the polymer is minimal. In one or more embodiments, the polymer is water soluble.

Examples of linear, hydrophilic polymers include polyvinyl alcohol, linear polysaccharides, polyamides, polyacrylic acids, polyacrylic amides, polyurethanes with polyethylene glycol ether soft segments, and the like, and combinations and copolymers thereof.

In one or more embodiments, the polymer is characterized by a weight average molecular weight (Mw) of from about 9000 to about 300,000 g/mol, in other embodiments, from about 146,000 to about 186,000 g/mol, when measured by gel permeation chromatography.

In one or more embodiments, the polymer is characterized by a degree of hydrolysis that is at least about 75%, in other embodiments, at least about 95%, in other embodiments, at least about 98%.

In one or more embodiments, the electrical conductivity of the polymer is very low. Indeed, in one or more embodiments, the polymer may be characterized as an electrical insulator.

In one or more embodiments, the thermal conductivity of the polymer is very low.

Organic Additive

In one or more embodiments, the composite includes at least one organic additive. In one or more embodiments, the organic additive is hydrophilic. In one or more embodiments, the organic additive is water soluble. In one or more embodiments, the organic additive is capable of forming hydrogen bonds. In one or more embodiments, the organic additive includes at least two polar functional groups that are capable of forming hydrogen bonds. The functional groups may be the same or different. In one or more embodiments, the organic additive includes at least two functional groups selected from the group consisting of hydroxyl, amine, and carboxylic acid functional groups. In one or more embodiments, one or more of the functional groups are terminal functional groups.

In one or more embodiments, the organic additive is selected from the group consisting of polyols, biopolymers, amino acids, aminoalcohols, dicarboxylic acids, and combinations thereof.

For purposes of this specification, the term polyol should be interpreted to include organic compounds containing two or more hydroxyl groups. Polyols are sometimes referred to as diols or glycols. Examples of polyols include diethylene glycol, tetraethylene glycol, hexaethylene glycol, 1,5 pentanediol, and polyalkylene glycols such as polyethylene glycol, polypropylene glycol, and copolymers thereof. In one or more embodiments, the polyol is characterized by a relatively short chain length. In one or more embodiments, the polyol is a C2-C6 diol.

In one or more embodiments, the polyalkylene glycol is characterized by a relatively short chain length. In one or more embodiments, the glycol is selected from about oligomers and polymers having a molecular weight (Mw) below 20,000 g/mol, in other embodiments, less than 10,000 g/mol, in other embodiments, less than 1,000 g/mol. In one or more embodiments, the glycol is characterized by a Mw of from about 300 to about 20,000 g/mol.

Examples of biopolymers include lignins, gelatins, and combinations thereof. Biopolymers are further described in U.S. Pat. App. Pub. No. 20040115424 A1, which is incorporated by reference herein. In one or more embodiments, the organic additive is gelatin from porcine skin. In one or more embodiments, the organic additive is alkali lignin.

Examples of dicarboxylic acids include C1-6 dicarboxylic acids. In one or more embodiments, the dicarboxylic acid is selected from the group consisting of aliphatic dicarboxylic acids. In one or more embodiments, the dicarboxylic acid is selected from the group consisting of C1-4 aliphatic dicarboxylic acids. Examples of dicarboxylic acids include oxalic acid, malonic acid, succinic acid, and combinations thereof.

In one or more embodiments, the organic additive may be referred to as a hybrid, and is characterized by having two distinct terminal functional groups. Examples of hybrid additives include amino acids and aminoalcohols. In one or more embodiments, the amino acid is selected from the group consisting of L-Aspartic acid, L-Glutamic acid, L-Ornithine hydrochloride, L-Lysine hydrochloride, L-cysteine, beta-alanine, and combinations thereof. Examples of aminoalcohols include ethanolamine.

In one or more embodiments, the electrical conductivity of the organic additive apart from the polymer blend is very low.

In one or more embodiments, the thermal conductivity of the organic additive alone is very low.

Amounts of Polymer and Additive

Advantageously, the relative amounts of the linear hydrophilic polymer and the organic additive may be selected to provide an optimum balance of properties, including thermal conductivity, tensile strength, and transparency.

In one or more embodiments, including when the additive is selected from polyalkylene glycols, the weight ratio of additive to polymer is from about 1:1 to about 1:20, in other embodiments, from about 1:3 to about 1:15, in other embodiments, from about 1:5 to about 1:12.

In one or more embodiments, the amount of additive may be expressed in terms of the weight percent of additive, based upon the total weight of the additive and polymer. In one or more embodiments, the amount of additive is at least about 0.1 weight percent (wt. %), in other embodiments, at least about 0.5 wt. %, in other embodiments, at least about 1 wt. %, in other embodiments, at least about 2 wt. %, based upon the total weight of the polymer and additive. In one or more embodiments, including when the additive is selected from biopolymers, the amount of additive is up to about 50 wt. %, in other embodiments, up to about 40 wt. %, in other embodiments, up to about 30 wt. %, in other embodiments, up to about 25 wt. %, in other embodiments, up to about 20 wt. %, in other embodiments, up to about 10 wt. %, based upon the total weight of the polymer and additive.

Advantageously, thermally conductive polymer composites of the present invention exhibit thermally conductivity without the need for conventional conductive fillers, such as metal, ceramic, and carbon fillers. In one or more embodiments, the polymer composites of the present invention include less than about 10 wt. % of any metal, ceramic, or carbon filler, in other embodiments, less than about 5 wt. %, in other embodiments, less than about 1 wt. %, and in other embodiments, less than about 0.5 wt. % of any metal, ceramic, or carbon filler, based upon the total weight of the polymer composite. In one or more embodiments, the polymer composite is devoid of any metal, ceramic or carbon filler.

Method of Preparing

Generally, the thermally conductive polymers of the present invention may be prepared by solution casting or solvent casting. In one or more embodiments, a solvent blend may be prepared by combining a solvent, the linear polymer, and the organic additive. Solution casting or solvent casting of the solvent blend may be employed to form a polymer-organic additive composite. Solution casting is described in U.S. Pat. Nos. 2,491,642, 6,368,534, 7,588,709, 7,597,831, 7,946,835, 7,972,547, 8,070,999, 8,101,109, and U.S. Pat. App. Pub. Nos. 2008/0081118 A1, 2008/0230945 A1, 2009/0127736 A1, 2009/0302495 A1, all of which are incorporated herein by reference.

In one or more embodiments, the solvent is aqueous. In one or more embodiments, the thermally conductive polymers may be prepared by a method that includes the steps of combining the linear, hydrophilic polymer, the organic additive, and water, optionally at elevated temperature, to form an aqueous blend, and then drying or evaporating the blend to remove the water. In one or more embodiments, the linear hydrophilic polymer is mixed with water at a temperature of from about 90-95° C., with stirring, to form a clear, aqueous polymer solution. In one or more embodiments, the solution includes about 7 wt. % of the linear hydrophilic polymer, based upon the total weight of the aqueous solution. In one or more embodiments, the organic additive is combined with water at about room temperature, and mixed to form an aqueous additive solution, and then the aqueous polymer solution and the aqueous additive solution may be combined to form an aqueous blend of the desired concentrations. In one or more embodiments, the aqueous blend is mixed at room temperature for a period of time to ensure good blending, e.g. about 30 minutes. The aqueous blend may then be dispensed and dried and/or heated to form a dried polymer coating or film. In one or more embodiments, a dispensed layer of aqueous blend is dried at about 35° C. for about 3 days, and then heated at about 80° C. for about 3 days.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Experiment IA—Thermal conductive pathways through polymer blends—Blend of Poly-vinyl Alcohol (PVA) and Poly-ethylene Glycol (PEG).

Materials: Poly-vinyl Alcohol (PVA) having molecular weight of 146,000-186,000. The degree of hydrolysis of PVA was 99%+. Poly-ethylene Glycol (PEG) with molecular weight of 400.

Preparation: PVA was first dissolved in deionized (DI) water at 90-95° C. for 5 hours to make 7 wt % aqueous (aq.) PVA solution under constant magnetic stirring. After obtaining clear aqueous PVA solution, it was then cool down to room temperature. PEG-400 was added to DI water at room temperature and mixed for 10 min. Later PEG solution was added to 7% aq. PVA solution to make various PEG-PVA blend solutions with weight (wt.) ratio of 1:15, 1:12, 1:9, 1:6 and 1:3 PEG to PVA. To obtain a homogenous film forming solution, the solutions were mixed at room temperature with mechanical stirrer at 1700 rpm for 30 minutes. The blend mixture was then poured into a glass petri dish and dried at 35° C. for 3 days and then further heated for 3 days at 80° C. to obtain freestanding films.

Figure 1:
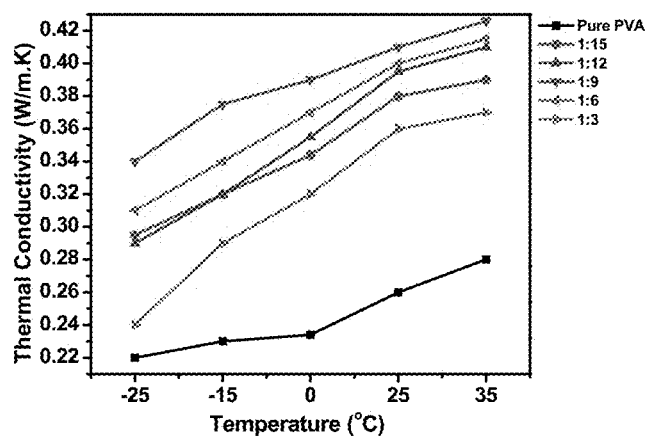
FIG. 1 provides Thermal conductivity versus temperature plot of polyvinyl alcohol (PVA) films, with and without polyethylene glycol (PEG).

Results: Thermal conductivity (TC) of all the samples is shown in FIG. 1. Pure PVA has thermal conductivity of around 0.26 watts per meter-kelvin (W/m·K). This value is within the range of values reported in previous studies. The highest thermal conductivity of 0.41 W/m·K was found in the 1:9 PEG-PVA sample, which is 1.6 times the pure PVA film. The surprising thermal conductivity enhancement of PEG-PVA composites is believed to be due to new thermal conductive pathways formed through hydrogen bonding interactions between PVA and PEG.

Figure 2:
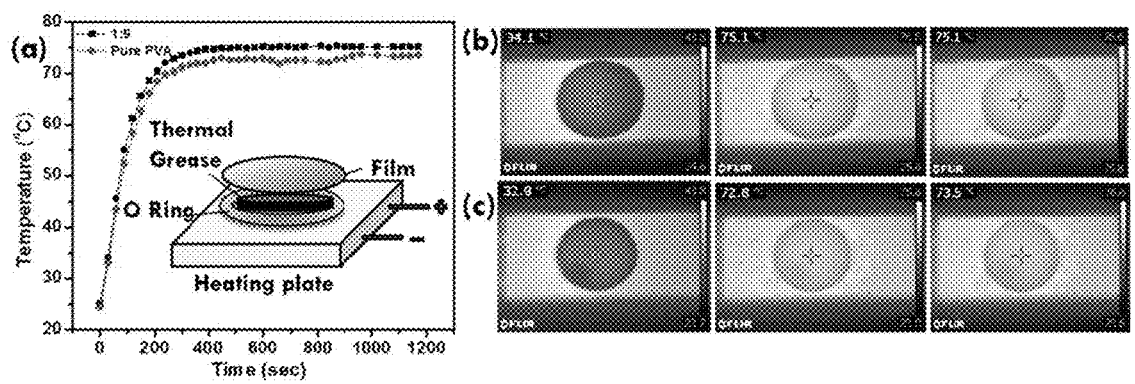
FIG. 2 (a) Temperature-time profile of films. Insert is the schematic of experimental setup. FLIR thermal images of (b)1:9 PEG-PVA film (c) pure PVA at 30, 600 and 1730 seconds.

To validate the performance of PEG-PVA film in electronic packing application, the ability to dissipate heat was measured using a thermal camera. A rectangular electric heating plate of size 7×3 cm was used as a heat source. To reduce the thermal contact resistance between heating plate and film, a lab-made thermally conductive paste composed of graphite dispersed in silicon oil matrix with thermal conductivity of 1.35±0.25 W/m·K was used. A rubber O-ring with height of 3 mm was filled with paste uniformly. Then the film of pure PVA and 1:9 PEG-PVA were individually tested for their heat dissipation ability by placing them on top of 0-ring. FIG. 2(a) shows the schematic of the setup and the temperature-time profile. During early 5 minutes, the slope of PVA-PEG film is higher than pure PVA, which is attributed to its higher heat dissipating nature. After stabilization, the highest temperature of 75.1° C. was achieved by PEG-PVA film whereas pure PVA could reach 73.5° C. at the same time. High thermal conductivity of PEG-PVA films leads to less thermal resistance, which made it possible to reach higher temperature in less time. Rise in temperature was monitored using FUR camera and images were taken every 30 seconds. Thermal images of PEG-PVA and neat PVA films at 30, 600 and 1730 secs are presented in FIGS. 2b and 2c, respectively. From FUR images, it can be noted that the rate of change of temperature for 1:9 PEG-PVA is higher than the pure PVA, which implies the thermal resistance of PEG-PVA film is lower than pure PVA film.

Figure 3:
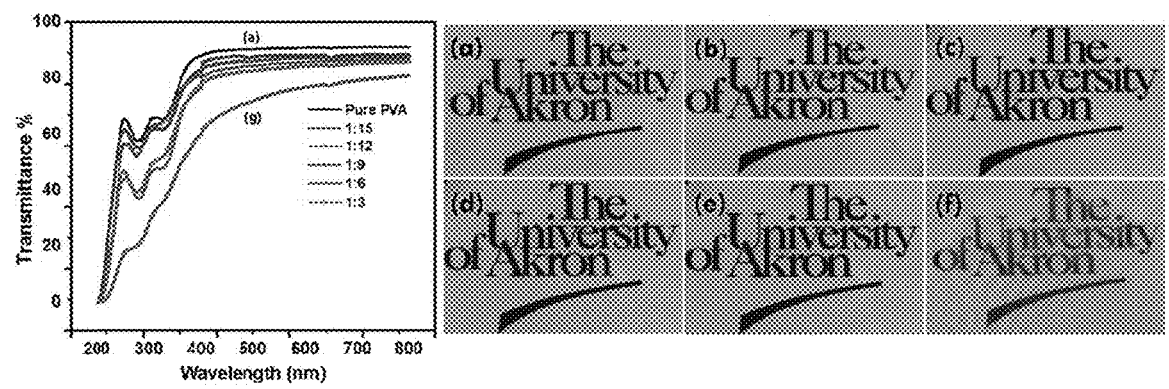
FIG. 3 provides UV-Vis and optical images of PEG-PVA films in increasing order from (a) to (f) represent pure PVA and PEG-PVA films of 1:15, 1:12, 1:9, 1:6, 1:3 ratios.

UV-Vis analysis of PEG-PVA and pure PVA is presented in FIG. 3. Transmission spectrum was carried out in the range of 800 to 200 nm. The transparency of pure PVA film was around 90% and the transparency gradually decreases as the weight percentage of PEG increases. The lowest transparency is observed in the sample with 1:3 mass ratio, perhaps due to phase separation. PEG-PVA system is a miscible system up to a particular mass ratio and beyond that PEG-PVA becomes immiscible. Overall, transparency of all sample films except 1:3 is greater than 80% in the visible range. High thermal conductivity coupled with excellent transparency adds extra feature to such films making them more appealing to heat electronic applications.

Experiment IB—Thermal conductive pathways through polymer blends—Blend of Poly-vinyl Alcohol (PVA) and biopolymers lignin and gelatin:

Materials: Gelatin from porcine skin (G90: 90-110 g bloom; G300: 300 g bloom), alkali lignin (Mw≈10,000 g/mole) and Poly(vinyl alcohol) (PVA, Mw=146,000~186,000, 99% hydrolyzed).

Preparations: PVA was dissolved in water and mechanically stirred at 90° C. for 12 hours to prepare 8 wt % PVA aqueous solutions. Then, appropriate amount of G90, G300 or lignin was added to the PVA solution. The amount of G90 and G300 in the aqueous solution was selected to be 2, 5 and 10 wt % based upon the total weight of the PVA and the additive. The amount of lignin was selected to be 0.5, 1, 2, 5 and 10 wt % based upon the total weight of the PVA and the additive. The mixture was continuously stirred at 90° C. for 6 hours to obtain a homogeneous solution. Then, the solution was blade-casted on a glass plate and dried at 50° C. for 24 hours. Finally, the polymer blend films (PVA/lignin, PVA/gelatin) were peeled off from the glass plate and kept in ambient environment for 7 days at a relative humidity of 50% before testing. With single biopolymer additive, the samples were named as "nX" where n means the weight percentage and X represents the biopolymer species (L: lignin). For comparison, pure gelatin films (both G90 and G300) were also prepared following the same procedure, while pure lignin is not able to form a continuous film. To study the synergistic effect of lignin and gelatin on thermal conductivity, G90 was selected to cover a broader range of solubility. The composition of lignin and G90 in PVA was selected as follows: (2+2), (2+5), (2+10), (5+2), (5+5), (5+10), (10+2), (10+5) and (10+10) wt % based upon the total weight of the PVA and the additive. Accordingly, these PVA/lignin/G90 blends were named as 2L-2G90, 2L-5G90, 2L-10G90, 5L-2G90, 5L-5G90, 5L-10G90, 10L-2G90, 10L-5 G90 and 10L-10G90.

Figure 4:
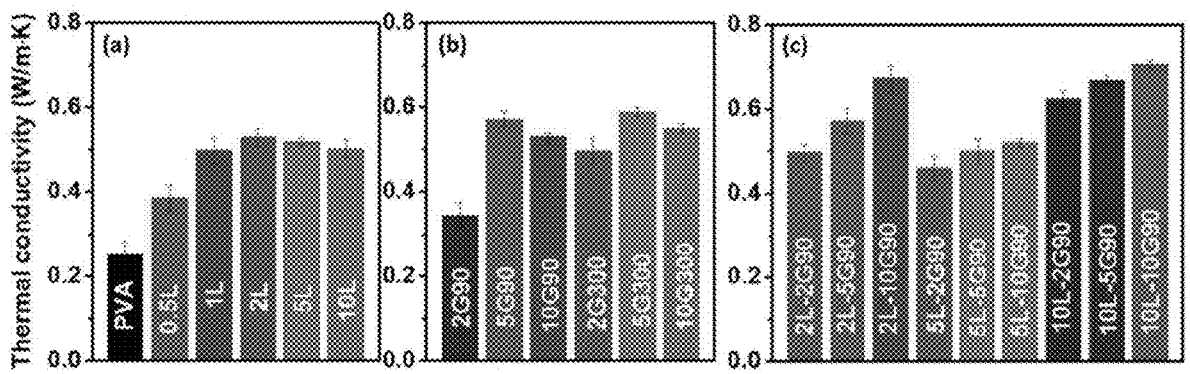
FIG. 4 provides thermal conductivity of polymer blends: (a) PVA/lignin, (b) PVA/gelatin (G90 and G300) and (c) PVA/lignin/gelatin.

Results: Thermal conductivity of PVA, PVA/lignin, PVA/gelatin and PVA/lignin/gelatin blends was measured at 25° C. and the results are summarized in FIG. 4. PVA gives relatively low TC of 0.25 W/m·K that is consistent with previous reported values. FIG. 1(a). The addition of lignin in PVA increases TC value of the blends significantly and reaches the highest value of 0.53 W/m·K (112% enhancement) at 2% lignin. Afterwards, the TC value gradually decreases with further increasing lignin loading to 5 and 10%. The variation of TC value in the polymer blends of PVA/gelatin, both PVA/G90 and PVA/G300, follows a similar trend where the highest TC value is achieved at 5% gelatin loading (5G90: 0.57 W/m·K, 128% enhancement vs. PVA; 5G300: 0.58 W/m·K, 132% enhancement vs. PVA), FIG. 4(b). The miscible nature of the polymers facilitates the homogenous blending at molecular level. The intermolecular interaction among polymers is mainly driven by the strong H-bonds. Such H-bond facilitates the formation of continuous thermal pathway and reduces phonon scattering. Therefore, significantly enhanced TC was observed in the polymer blends. However, continuously increasing biopolymer loading in the PVA does not guarantee a homogeneous distribution. For example, dark spots corresponding to lignin particles start to appear in the films when lignin loading goes beyond 2%. Similarly, 10% gelatin in PVA leads to a semitransparent film that represents the aggregated gelatin domain in PVA. These experimental observations demonstrate that a uniform distribution of biopolymer is desired to improve the TC of polymer blends. Comparing the TC values at the same weight loading of G90 and G300, the TC of PVA/G300 is slightly higher than that of PVA/G90, because less phonon scattering occurs across the long polymer chains of G300. The synergistic effect of gelatin and lignin on the TC was also studied at varied ratios, FIG. 4(c). At fixed lignin loading, TC value continuously increases with increasing G90 loading. Comparing to PVA blends with single biopolymer additive (lignin or gelatin), the appropriate combination of lignin and G90 (2L-10G90, 10L-2G90, 10L-5G90 and 10L-10G90) has demonstrated even higher TC values. Specifically, the highest TC of 0.71 W/m·K is observed in 10L-10G90, which is 1.84 times larger than that of pure PVA film. It may be noted that polymer composite films based upon PVA and biopolymers such as lignin and gelatin may not exhibit the transparency that is achieved with other organic additives.

Figure 5:
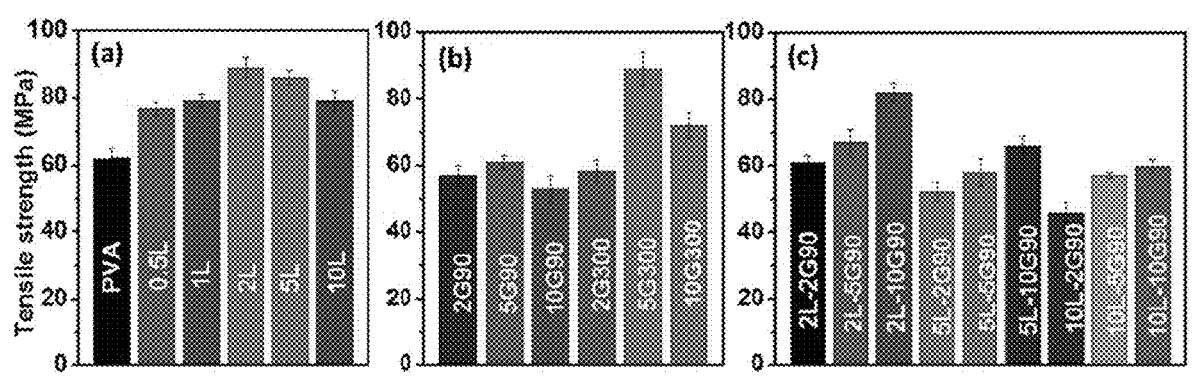
FIG. 5 provides tensile strength of polymer blends: (a) PVA/lignin, (b) PVA/gelatin and (c) PVA/lignin/gelatin.

Tensile test is performed on all the polymer blends and the tensile strength is summarized in FIG. 5. Tensile strength increases after the addition of lignin in PVA. The enhanced tensile strength of PVA/lignin could be attributed to the cross-linking nature of lignin that helps to develop a stronger inter-connected network with PVA. The addition of linear structured gelatin in PVA influences the tensile strength in different ways. For example, the addition of lower molecular weight G90 decreases the tensile strength, while higher molecular weight G300 increases the strength at relatively larger loadings of 5 and 10%. Such major difference in tensile strength is mainly attributed to the completeness of the interweaving structures between PVA and gelatin. Reviewing the variation of tensile strength as a function of biopolymer loading in FIG. 5 (a and b), a good correlation between tensile strength and thermal conductivity can be observed. The largest tensile strength of 89 MPa is achieved in PVA/lignin at 2% lignin loading. In PVA/gelatin, the highest tensile strength is both achieved at 5% loading with G90 at 61 MPa and G300 at 89 MPa, FIG. 5(b). At the same gelatin loading, PVA/G300 shows larger tensile strength than PVA/G90. This could be one of the reasons for the observed larger TC values from PVA/G300. By integrating both lignin and gelatin in PVA, the tensile strength of the blends was investigated, FIG. 5(c). While fixing the lignin loading, the tensile strength continuously increases with increasing G90 loading from 2 to 10%.

Experiment IIA—Thermal conductive pathways through self-organized crystals—Poly-vinyl Alcohol (PVA) blended with dicarboxylic acid molecules Materials. Oxalic acid (OA, ≥99%), malonic acid (MA, 99%), succinic acid (SA, ≥99%) and Poly (vinyl alcohol) (PVA, Mw=146,000~186,000, 99% hydrolyzed).

Materials Preparation. PVA was dissolved in water with 8% mass fraction at 90° C. for 12 hours. Secondly, dicarboxylic acid (DCA), including OA, MA or SA was combined with the PVA solution such that the amount of additive was 10, 20, 30 and 40%, respectively, based upon the total weight of the PVA and the additive. The mixture was continuously stirred at 90° C. for 6 hours to obtain a homogeneous solution. The solution was casted on glass plate with a casting blade and dried at 50° C. for 24 hours. Finally, the PVA film was peeled off from the glass plate and kept in ambient environment for 7 days at a relative humidity of 50% and room temperature before testing. For clarity purpose, the PVA composite films were named in following format: PVA/X-Y. X represents the DCA including OA, MA and SA; Y is the mole percentage of DCA in PVA, Y=10, 20, 30 and 40. PVA and PVA/X-10 films were then thermally treated at 120° C. for different times (1, 3, 5, 7 and 9 hours) and the samples were denoted as PVA-HT and PVA/X-10-HT.

Results: Complicated crystal structures were observed when increasing DCA concentration, FIG. 6. By increasing OA concentration to 20%, dendrite crystals were observed, FIG. 6(c). Further increasing OA concentration to 30% leads to the formation of diffusion limited aggregates (DLA) structure FIG. 6(d). Similar phenomenon was observed in PVA/SA system, FIG. 6(f-h), where a structural transition from dendrite, DLA to spherulite crystals was observed by increasing SA concentration from 20, 30 to 40%, respectively.

Figure 6:
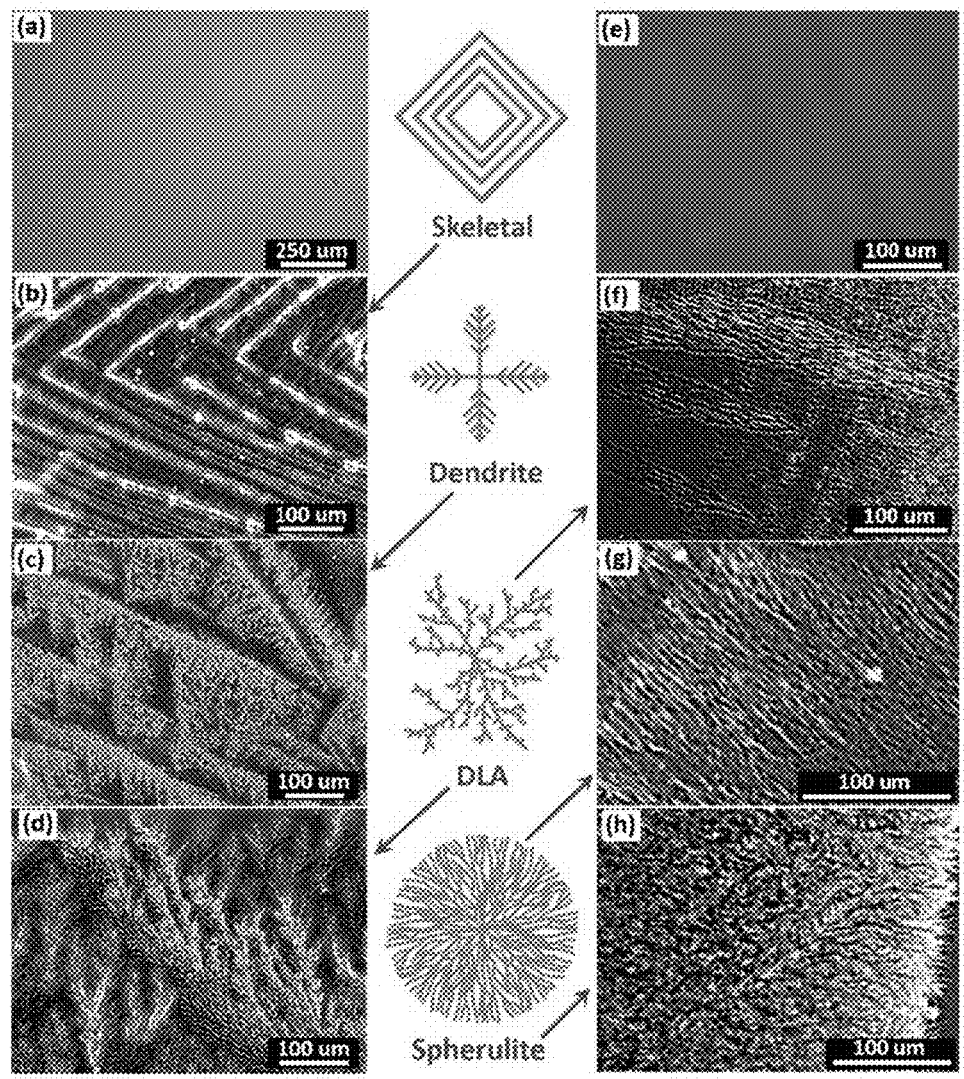
FIG. 6 provides optical microscopy images of polymer blends of PVA and various dicarboxylic acids: oxalic acid (OA), malonic acid (MA), and succinic acid (SA); (a) pure PVA, (b) PVA/OA-10, (c) PVA/OA-20, (d) PVA/OA-30, (e) PVA/SA-10, (f) PVA/SA-20, (g) PVA/SA-30 and (h) PVA/SA-40. The schematic pictures, skeletal, dendrite, DLA and spherulite represent the typical crystal structures formed in each material. PVA film format: PVA/X-Y, X represents the oxalic acid (OA), malonic acid (MA), succinic acid (SA); Y is the mole percentage of OA/MA/SA in PVA.
Figure 7:
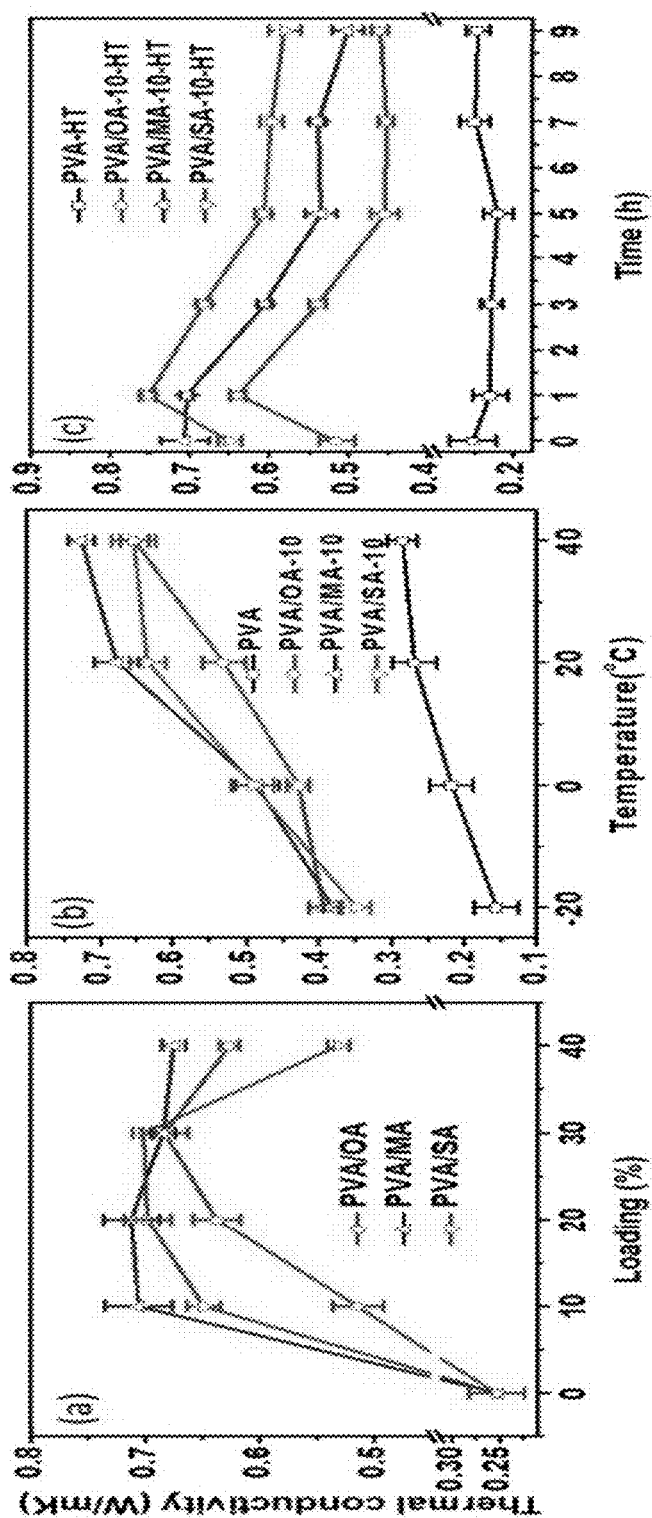
FIG. 7 provides: (a) thermal conductivity of pure PVA and PVA and dicarboxylic acid (DCA) composites with different loadings at 20° C., (b) effect of temperature and (c) heat treatment time on thermal conductivity of PVA composite with 10% DCA loading. Heat treatment is performed at 120° C.

Thermal conductivity of PVA and PVA/DCA composites was measured at 20° C., FIG. 7(a). PVA gives relatively low TC of 0.25 and the addition of DCA crystals increases the TC dramatically. For instance, the TC value reaches to 0.51 W/mK by adding 10% OA in PVA. Even higher TC values of 0.70 and 0.65 W/mK are obtained with 10% of SA and MA, respectively. TC value of PVA/OA and PVA/SA follows a similar trend that the highest TC value is achieved at 30% OA(SA) and then decreased afterwards. PVA/MA gives relatively stable TC value over the entire range of loading from 10-40%. The significantly enhanced TC value at low crystal loading reveals the exceptional capability of crystal network in transfer heat (phonon). However, the drop of TC at large crystal loading (>30%) clearly points out the fact that crystal loading is not the only factor that determines the TC. In general, larger DCA loading will lead to a more branched crystal structure, as seen in FIG. 6. At lower crystal loading, the increased crystals dominate the phonon transfer and thus the thermal conductivity increases with increasing crystal loadings. However, each branch in the crystal behaves as a phonon scattering center that decreases the phonon transfer efficiency. Therefore, reduced TC was observed when loading increases to 40%. Surprisingly, even though the modulus of the composites is decreased after adding DCA, the thermal conductivity still increases. This result confirms the significant contribution of the continuous crystal network in heat transfer.

Figure 8:
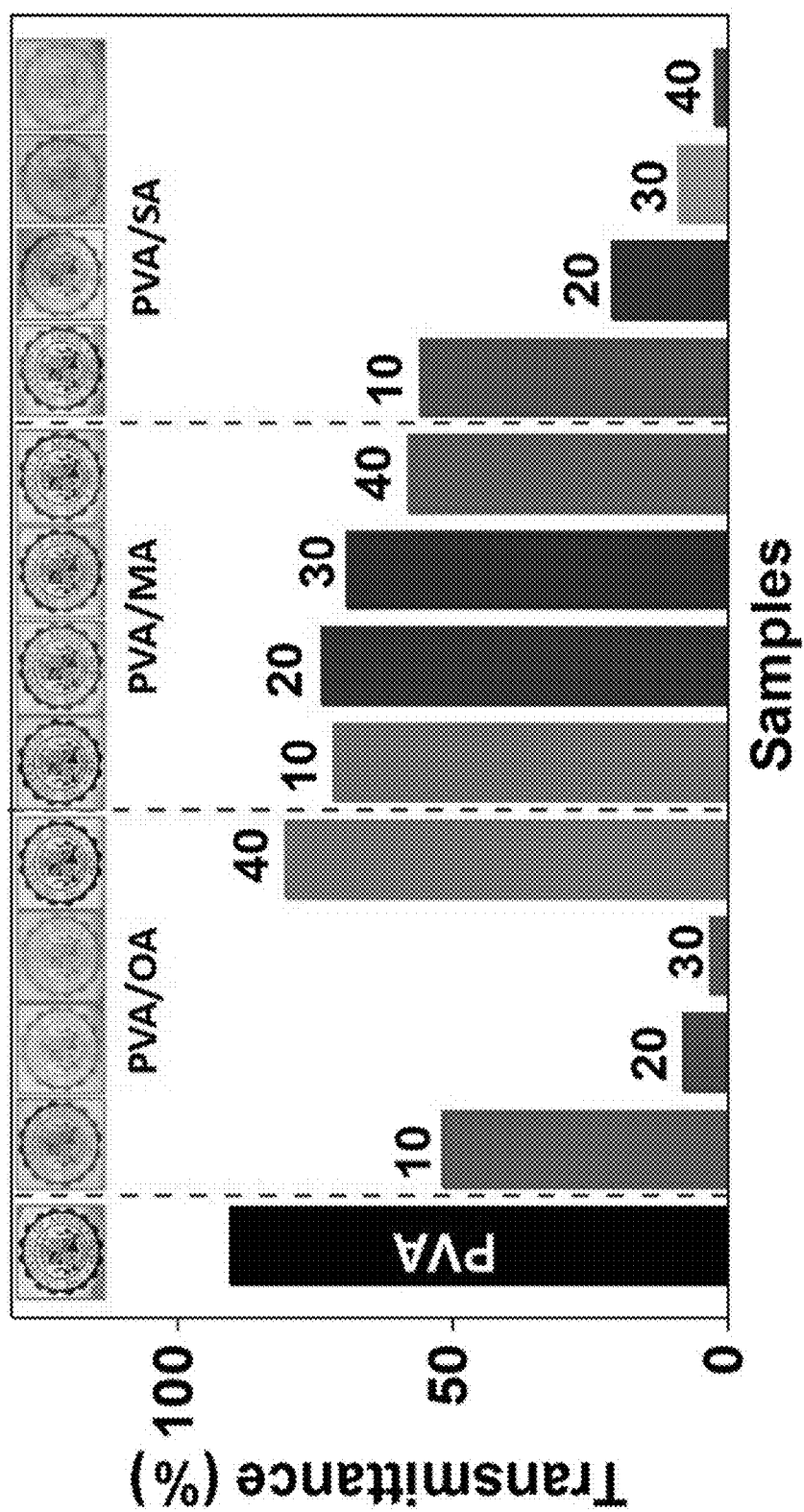
FIG. 8 provides transmittance of pure PVA and PVA composites blended with OA, MA and SA at different loadings (at 700 nm). The number above the columns indicates the weight percentage. The whole spectrum from 400-1100 nanometers (nm) is in FIG. S5. The photographs were taken by placing a film on UAkron logo with film thickness of 0.3-0.4 mm.

The optical transparency PVA and PVA/DCA composite film was characterized by UV-Vis spectrometer and the transmittance at 700 nm is plotted in FIG. 8. The PVA gives the highest transmittance of 90%, while the transmittance decreases after introduction DCA crystals in the film. Overall, PVA/MA provides the highest transparency followed by PVA/SA and PVA/OA. Larger DCA concentration leads to a decreased transparency of the composite films due to their more condensed crystal structures. The relatively higher optical transparency of PVA/MA could be attributed to the sparsely distributed large crystals.

Figure 9:
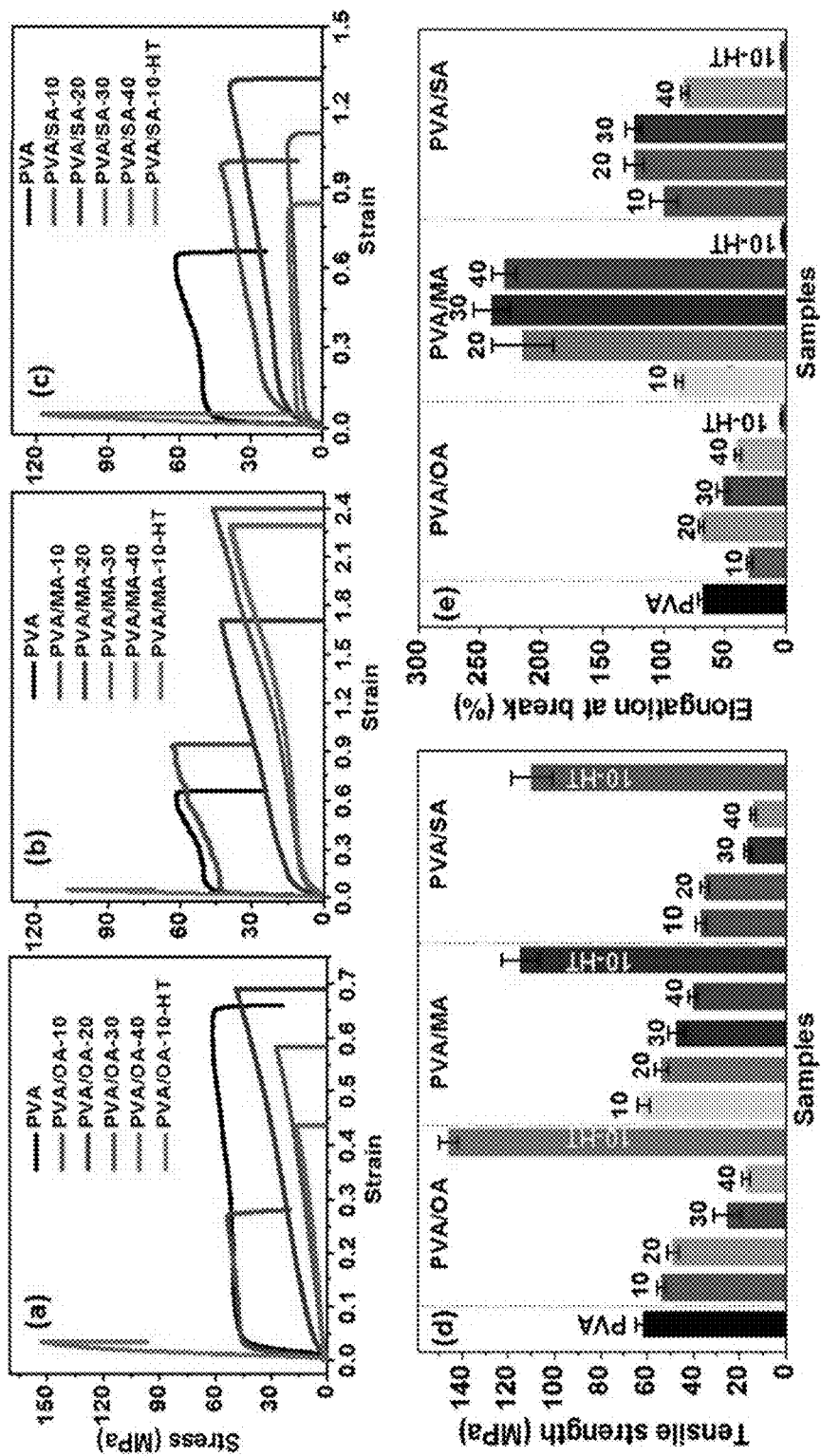
FIG. 9 provides strain-stress curves of (a) PVA/OA, (b) PVA/MA and (c) PVA/SA composites. Summarization of (d)

The tensile properties of these composite films were also characterized. The strain-stress curves were plotted in FIG. 9(a-c). The tensile strength and elongation at break were summarized in FIGS. 9(d) and (e), respectively. Generally, the addition of DCA crystals in PVA film decreases the tensile strength and the strength decreases with increasing DCA concentration. However, the enhancement of elongation-at-break was clearly observed in PVA/MA and PVA/SA systems. These results indicate that the addition of DCA interrupted the physical entanglement of PVA chains and introduced free space in the composites that causes the reduction of tensile strength.

Experiment IIB—Thermal conductive pathways through self-organized crystals—Poly-vinyl Alcohol (PVA) blended with amino acid molecules Materials. L-Aspartic acid (Asp, ≥98%), L-Glutamic acid (Glu, 99%), L-Ornithine hydrochloride (Ori, 99%) and L-Lysine hydrochloride (Lys, ≥99%), L-Cysteine (Cys, 97%) and Poly (vinyl alcohol). The molecular structure of amino acids and PVA is presented in Scheme 1.

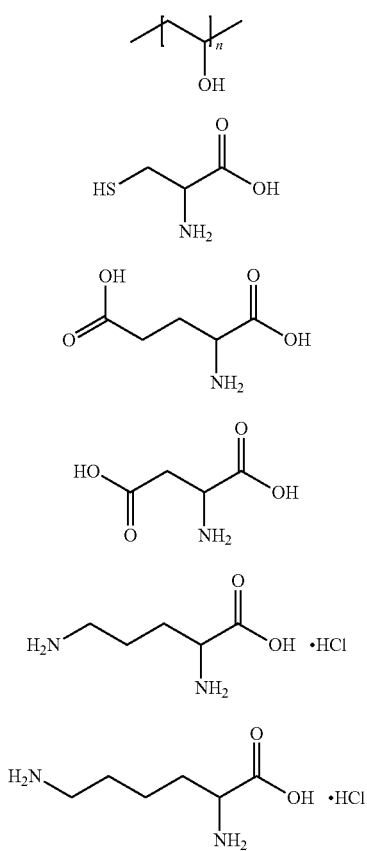

Scheme 1: Molecular structure of (a) PVA, (b) cysteine, (c) aspartic acid, (d) glutamic acid, (e) ornithine-HCl and (f) lysine-HCl.

Material Preparation. 3.0 g PVA was firstly dissolved in 34.5 g water and mechanically stirred at 90° C. for 12 hours to prepare 8 wt % PVA aqueous solution. Then, 2.27 mmol amino acid was added to the PVA Solution. This corresponds to 8.4, 9.2, 10.0, 11.3 and 12.2 wt % of Cys, Asp, Glu, Ori and Lys, respectively based upon the total weight of the PVA and the additive. The mixture was continuously stirred at 90° C. for 6 hours to obtain a homogeneous solution. The solution was casted on glass plate with a casting blade and dried at 50° C. for 24 hours. Finally, the PVA film was peeled off from the glass plate and kept in ambient environment for 7 days at a relative humidity of 50% before testing.

Results: The microstructure of PVA and PVA/AA composites was characterized by SEM. As seen in FIG. 10, PVA gives a very smooth surface while PVA/AA composites present clear crystal textures. The pattern of those textures is vastly different from each other. For example, PVA/Cys (10a) and PVA/Lys (10b) show network-like structure with inter-connected submicron domains. Dendrite form of glutamic acid crystals (10c) is observed in PVA/Glu (10d). PVA/Ori (10e) shows partially connected crystal particles those are well distributed in the PVA matrix. In PVA/Asp (10f), skeletal crystal structure is clearly observed with partial aggregation. The crystal structure has great influence on the thermal conductivity of composites. Since phonon transport largely depends on the material structure (down to atomic level lattice), micron-scale structure feature does not necessarily convey sufficient information to interpret phonon transport at such a large scale. Therefore, AFM was used to capture lower-level structural characteristics of the composites, FIG. 11. Apparently, pure PVA gives a smooth surface as expected. Interestingly, the PVA/AA composites show two different crystal patterns. One is AA crystals in continuous pattern (FIGS. 11b and c) and the other is discrete particle-shaped crystals distributed in polymer (FIG. 11d-f). Theoretically, continuous crystal structure is beneficial to the phonon transport since less scattering would occur. Discrete crystal structure may lead to an increased amount of scattering of phonons at the PVA-AA interface.

Thermal conductivity (TC) measurement was then conducted on pure PVA and PVA/AA composites at room temperature, FIG. 12. The pure PVA shows thermal conductivity of 0.26 W/m·K, which is consistent with literature reports. The addition of all the five AAs in PVA leads to dramatically improved TC. The highest TC value of ~0.7 W/m·K (~170% enhancement) is achieved in PVA/Cys and follows by PVA/Lys (112%), PVA/Glu (92%), PVA/Ori (73%) and PVA/Asp (19%).

Experiment III—Thermal conductivity of hybrid organic additives

Materials. Polyvinyl alcohol (PVA) was purchased from Sigma-Aldrich having average molecular weight of 146 000-186 000 g/mol with degree of hydrolysis of 99%. Ethylenediamine (ED), ethylene glycol (EG), ethanolamine (EA), and β-alanine (AL) were purchased from Sigma-Aldrich. Deionized water (Millipore) having a minimum resistivity of 18.2 MΩ·cm was used in all of the experiments. All materials were used as received without further purification.

Preparation of PVA Composite Films. Solvent casting method was used to prepare pure PVA and PVA-organic additive composite films. A required amount of PVA was first dissolved in DI water at 90-95° C. for 5 h to make 7% aq PVA solution under constant magnetic stirring. Three different molar ratios (moles of PVA/moles of organic additive) of $1.18 \times 10^{-2}$, $6.85 \times 10^{-3}$, and $3.25 \times 10^{-3}$ were used to make PVA composite films. After obtaining clear aqueous PVA solution, it was poured in glass Petri dish and dried at 35° C. for 3 days to obtain freestanding films and later heated to 80° C. for another 3 days. Preparation of composite film samples was done through mixing clear aq PVA solution with different organic molecules under a magnetic stirrer for 3 h at 75-80° C. Freestanding composite films were obtained with a similar method as pure PVA films.

Characterization. FT-IR characterization was carried out by using Thermo Nicolet 380 FTIR with Diamond ATR. The X-ray diffraction analysis was done with a Bruker AXS D8 Discover diffractometer with GADDS (general area detector diffraction system) operating with a Cu-Kα radiation source filtered with a graphite monochromator (λ=1.541 Å).

Mechanical testing was done using ADMET 500 universal testing machine (MTEST Quattro, USA). Thermal conductivity measurements were made using a C-Therm TCi thermal conductivity analyzer. The TCi works on modified transient plane source technique (conforms to ASTM D7984), and its sensor acts as a heat source approximating heat flow in one dimension. For Scanning Thermal Microscopy (SThM), Park XE7-AFM with thermal module was employed.

Although covalent bonds being very strong and stiff have exceptional ability to drive phonons in bulk polymer, due to pronounced photon scattering, the resultant thermal conductivity is very poor. Hydrogen bonding, although weak, has the ability to drive the phonon, which is 10-100 times the van der Waals interaction. Various organic and inorganic molecules have the ability to form an intermolecular interaction, especially polymer, due to the presence of various functional groups consisting of proton donor, acceptor, or both. Such inter- or intramolecular interactions also significantly affect the physical properties like melting point, glass transition, mechanical stress, and so on. PVA with a high density of hydroxyl group on each neighboring atom can form both intra and intermolecular hydrogen bonding among hydroxyl groups.

Intermolecular interactions among various species can be probed by FTIR. In particular, shift or formation of a new peak can convey useful information on the kinds of molecules and bonds present in system. A shift in OH-peak position of PVA—organic additive composite is presented in FIG. 13. The hydroxyl stretching band is quite sensitive to the formation of intra/inter-hydrogen bonding in the system. The characteristic peak of PVA's hydroxyl band usually falls around 3500 cm$^{-1}$, while its C—H peak is □2900 cm$^{-1}$.32-34 The shift in the OH peak is due to the change in intermolecular interaction of organic molecules with the PVA chain. The OH peak, as seen from the Figure (inset), gradually shifts from pure PVA to a higher wavenumber in PVA-EA. For PVA composite with ED, EG, and EA, it is within the range of 3255 to 3275 cm$^{-1}$. EG has a —OH group at both terminals ends, whereas ED has —NH$_2$ groups. Hydroxyl peak of PVA composite with EA, which has both —NH$_2$ and —OH groups falls in between PVA-ED and PVA-EG. In PVA-AL, a broad peak was observed between 3250 and 2370 cm$^{-1}$ due to the overlap of peaks and interaction of hydroxyl groups, carboxylic acid and amide groups of amino acid. These organic molecules when incorporated in PVA lead to the formation of new interactions within the PVA matrix. Self-association of PVA which is due to the hydroxyl-hydroxyl interaction is rather random in nature without any specific pathways and is disturbed by new interactions. By the incorporation of organic additives into PVA, hydroxyl groups of PVA can form intermolecular interactions with —NH$_2$, —OH and —COOH functional groups of the organic additive. Such interactions can be seen as linkers connecting various polymer chains of PVA and forming new networks within the polymer chains.

The presence of abundant hydroxyl groups in PVA has significant impact on its various physical properties including crystallinity. The crystal structure of PVA due to extreme hydroxyl group intermolecular interactions leads to a random arrangement of polymer chains. The XRD of pure PVA and PVA composite films is presented in FIG. 14. The peak intensity of pure PVA is higher than all other composite films signifying higher crystallinity. The intensity of peak gradually decreases from PVA-ED to PVA-AL. The intense peak at around 19.8° is the signature peak of PVA attributed to its lattice. This peak is mainly due to the self-association of hydroxyl group found in PVA chain. Incorporation of organic molecules leads to formation of new interactions and hence significantly impacts the self-association of PVA. Crystallites of PVA are destroyed by the organic molecules making the polymer matrix more amorphous.

This study employs different organic molecules with varied ability to form intermolecular interaction with the host polymer matrix. Such intermolecular interactions can be used to drive phonon transport in polymers. FIG. 15 presents the thermal conductivity of PVA composite films at different molar loadings of organic additive. The thermal conductivity of PVA composite increases with the increase of loading. At lower loadings, the density of "thermal bridges" can be assumed to be less. As the loading increases due to the formation of more such kind of bridges, enhancement in thermal conduction is seen. Intermolecular interactions can lead to confinement of bond rotation of polymer chain in addition to improved chain arrangement which can facilitate phonon propagation in polymer matrix. Due to the presence of different terminal end groups in the organic linker molecules, the intensity of phonon transport can be significantly varied. As seen from the figure, the highest thermal conductivity at the highest loading is achieved by PVA-AL followed by EA, EG and ED respectively. The thermal conductivity of PVA-AL at 3.25×10$^{-3}$ molar ratio is 0.55 W/m·K while that of PVA-EA is 0.52 W/m·K. AL has dissimilar groups of —COOH and —NH$_2$ while EA has OH and —NH$_2$ at the terminal position. Comparing among ED, EG and EA which have combination of —OH and —NH$_2$ the tendency of EA to form hydrogen bonds per molecule has been found to be greater than EG and ED. The tendency of nitrogen and oxygen of EA is far more likely to be closer hydroxyl atoms. PVA with abundant hydroxyl group thus can form more stable conformation with EA than its two counterparts of EG and ED. Additionally, shorter distance in intermolecular interactions lead to efficient thermal bridges with ease of inter-chain phonon transport and less phonon scattering. In traditional polymer-filler composite, it has been seen that the use of dissimilar/hybrid fillers can lead to enhancement in thermal conductivity due to the synergistic impacts of such combination on polymer matrix. Such hybrid fillers facilitate a better phonon transport than the use of single filler. In EA, the presence of dissimilar functional groups provides the possibility of synergistic impact of intermolecular interactions for enhance phonon transport. PVA-AL with the hybrid group at terminal position has the highest thermal conductivity among all samples. For thermal conductivity, formation of efficient thermal linkages is another important factor. The presence of carboxylic acid leads to stronger hydrogen bonding interactions which are important for phonon transport. Such strong interaction makes the intermolecular bonding short which positively drive phonons. This advantage of AL over EA contributes to its better thermal conductivity in PVA. The formation of linear thermal linkages via thermal bridging chain within host polymer is important for efficient heat conduction. Inability to form linear thermal linkages which are more capable to drive phonon transport than one with hindered connections leads to decrement in thermal conductivity. Presence of —NH$_2$ and —COOH group has advantage of both the linear thermal linkages through NH$_2$ and strong hydrogen bonding through —COOH. Though in AL presence of —COOH has little disadvantage due to its bulkier structure but impact of strong interaction and presence of —NH$_2$ which promotes linear linkages is more dominating.

Apart from that AL can also lead to the formation of crystals and can impact the surrounding chain to enhance interfacial conductance. The dominating factor of strong and linear thermal network along with crystal formation than the bulkier connection resulted in the higher thermal conductivity of PVA-AL than its counterparts. The thermal conductivity of individual organic molecule (ED, EG, EA) is less than 0.3 W/m·K. but their composite with polymer lead to enhanced thermal conduction. This shows the significant influence of intermolecular interactions in driving phonons.

Mechanical testing was carried out further to investigate the influence of these organic molecules on pure PVA. FIG. 16 presents the modulus of elasticity (MoE) of all PVA composites. MoE of pure PVA was found greater than 7 GPa which gradually decreases from PVA-ED to PVA-AL. After incorporation of AL in the PVA, MoE is reduced by around 1.5 times. This result matches well with the previous XRD data where crystallinity was reduced gradually from pure PVA to PVA-AL. Interestingly here, the thermal conductivity is found inversely correlated with the MoE which is opposite to the present understanding. The effective contributing factors for the enhanced thermal conductivity here is the presence of thermal bridges which are formed at the expense of destroying the inter/intra molecular hydrogen bonding present in the pure PVA. Extreme hydrogen bonding in pure PVA results in its increased crystallinity and MoE. Random intermolecular interaction leads to poor phonon transport due to phonon scattering which is reflected in lower thermal conductivity of bulk PVA. The carbon-carbon bond with high stiffness can lead to enhanced thermal conduction which is very well exhibited in single polymer chain, however in bulk polymers due to massive phonon scattering the resultant thermal conductivity is very poor. Additionally, thermal conduction in polymer can be impacted by various factors like bond rotation, interfacial resistance, intermolecular interaction etc.

To further elucidate the intricacies of the thermal conduction through these organic molecules, Scanning Thermal Microscopy (SThM) was employed along with contact AFM to throw substantial light on macroscopic thermal conduction in these composites. FIG. 17 (A1-A4) presents the topography of all the composite films. Scan size of both the topography and probe current was 10×10 μm. Topography of all the samples is quite smooth with roughness values of less than 8 nm. There are no significant features found in the topography except for PVA-AL where discrete spherical patterns were seen. Such patterns can be attributed to the strong interaction of AL to the PVA chains leading to self-organized crystals. Such interactions have been found to facilitate polymer chain confinement in the vicinity of the additives. Average probe current is further presented in FIG. 17 (B1-B4). The SThM functions on the wheat stone bridge where probe current is released through the probe tip depending on the thermal conductivity of the samples. The probe tip essentially functions as resistive heater element which maintains a constant temperature while compensating for heat loss or gain through a feedback loop. Such characterization essentially reveals microscopic heat transfer information where average probe current is proportional to thermal conduction ability of materials. This helps to establish a quantitative as well as qualitative information with respect to thermal transport properties in material. Probe current images of all samples show discrete distribution over scan size though PVA-EA have more concentrated current density at the center than edges. In PVA-AL, high topography region corresponds to lower thermal conductivity region in the SThM images which is a similar finding as reported earlier. Due to crystal formation, AL influences the neighboring PVA chain leading to better chain confinement which promotes thermal conduction. The thermal conductivity essentially is not governed by crystals but the chain confinement in its vicinity as evidenced by the SThM image. Such chain confinements along with strong intermolecular interaction can help in reducing interfacial thermal resistance which in turn enhances phonon transport.

Further the average probe current values of all the sample is presented in FIG. 18. Thermal conductivity can be greatly influence by the lattice structure present in the material. The microscopic measurement of the average probe current is one of important tools to characterize thermal conduction. This gives a good estimation of the overall thermal conductivity in addition to the microscopic details of the region of higher and lower thermal conductivity. The probe current gradually rises from PVA-ED to PVA-AL, which matches well with the measurement of the bulk thermal conductivity in the films. As discussed, thermal conductivity is a complex phenomenon which can be impacted by various factors like constraints polymer chain, lattice structure, intermolecular interactions etc.

Overall summarized thermal conductivity of all samples with highest loading of organic additives is summarized in FIG. 19. Thermal conductivity was found positively correlated with average probe current as obtained from the SThM results. It is interesting to note that organic additives with dissimilar/hybrid groups have higher thermal conductivity than the one's with similar group. Composite with hybrid group with various contributing factors like increased intermolecular interaction, polymer chain confinement, influence of crystals, reduced interfacial thermal resistance etc. is proposed to create a synergistic impact which ultimately lead to enhanced thermal conduction.

Optically transparent at the same time thermally conductive polymer composite can have wide spectrum of applications in various industries. FIG. 20 presents the optical images of all samples. All images have good transparency with respect to pure PVA. Using organic additives, it has been demonstrated that thermal conductive material with higher optical transparency can be synthesized. In conventional polymer-additive composite due to the high loading of opaque additives, it's difficult to achieve optical transparency. This bottleneck can be easily circumvented using such organic additives.

The present invention provides a process for engineering intermolecular interaction through the use of small organic linkers to make films with higher thermal conductivity while maintaining good optical transparency. The propagation of phonons was channeled through the intermolecular interaction presence in the PVA host matrix. Different organic molecules with varied terminal groups showed different thermal conductivity signifying the impact of thermal linkages. Thermal connection through these organic additives can be impacted by various factors like its length, hydrogen bonding, molecular geometry, chain arrangement etc. The organic additives with linear thermal network and strong interactions can better drive the phonon transport than the weak ones. In addition, there can be many other contributing factors which can have significant influence over thermal conductivity. The highest thermal conductivity was achieved by PVA-AL (0.55 W/m·K) followed by PVA-EA (0.52 W/m·K). Both these molecules have hybrid/dissimilar molecules at their terminals which is proposed to create a synergistic impact owning to their strong intermolecular interaction and reduced interfacial thermal resistance. Various influences of these organic molecules over base polymer were found like change in intermolecular interactions, crystallinity, MoE, formation of crystals etc. One of interesting thing noted was inverse correlation of thermal conductivity with crystallinity. This was confirmed through XRD and mechanical testing of the samples. Intrinsic inter/intra hydrogen bonding of the neat polymer was destroyed by the incoming organic molecules and lead to the formation of new interactions. Overall, this study throws light on some of the interesting drivers of thermal conductivity in neat polymer matrix which can be used in the development of better heat dissipating materials for thermal management application and thus assist in energy saving and increased environmental wellbeing.

Experiment IV—Thermal conductivity of polyol organic additives

Materials

Poly-vinyl alcohol (PVA) was purchased from Sigma-Aldrich having average molecular weight of 146,000-186,000 g/mol. This was used as a host matrix in all the polymer films studied here. Diethylene glycol(DEG) (99%) and tetraethylene glycol(TEG) (99%) were purchased from Sigma-Aldrich and hexaethylene glycol(HEG) (96%) was purchased from Alfa-Aesar. Nomenclature XEG is used while addressing DEG, TEG, HEG and other polyethylene glycol (PEGs). 1,5-pentanediol(PDiol, +97%) and glutaric acid (GA, 99%) were purchased from Sigma-Aldrich while 2,4-Pentanedione(PDione, 99%) was purchased from Acros. Deionized water (Millipore) having a minimum resistivity of 18.2 MΩ·cm was used in all the experiments. All materials were used as received without further purification.

Sample Preparation

Solvent casting method was used to prepare pure PVA and composite films. Fixed amount of PVA was first dissolved in DI water at 90-95° C. for 5 hours to make 7% aq. PVA solution under constant magnetic stirring. Three different PVA to XEG molar ratios of $1.18\times10^{-2}$, $6.85\times10^{-3}$ and $3.25\times10^{-3}$ were used to make composite films. All XEGs were firstly dissolved in water in required amount and then mixed with PVA solution for 3 hours at 80° C. under magnetic stirrer to make PVA-XEG blend solution. After obtaining clear aqueous PVA blend solution, it was poured in glass petri dish and dried at 35° C. for 3 days and later heated at 80° C. for another 3 days to obtain freestanding films. GA, Pdiol and Pdione composite films were prepared with similar method except films with only $3.25\times10^{-3}$ molar ratio were prepared.

Characterization

Mechanical testing was done using ADMET 500 universal testing machine (MTEST Quattro, USA). FT-IR characterization was carried out by using Thermo Nicolet 380 FTIR with Diamond ATR. The X-ray diffraction analysis was performed with a Bruker AXS D8 Discover diffractometer with GADDS (General Area Detector Diffraction System) operating with a Cu-K α radiation source filtered with a graphite monochromator (λ=1.541 Å). Glass transition was characterized by DSC (TA instrument Q100) in $N_2$ with a heating rate of 10° C./min. Thermal conductivity was measured using C-Therm TCi Thermal Conductivity Analyzer. The TCi works on modified transient plane source technique (Conforms to ASTM D7984) and its sensor acts as a heat source approximating heat flow in one dimension.

Results and Discussion

PVA is a semi-crystalline polymer with hydroxyl group present in every next carbon atom. Due to the presence of ample hydroxyl groups throughout the polymer backbone, it experiences both intra and inter hydrogen bonding. The dissolution of PVA in water is also the result of such interactions. When PVA is dissolved in water, its inter/intra hydrogen bonding is replaced by hydrogen bonding with water molecules, which leads to good solubility. This abundant hydrogen bonding also dictates its physical properties like glass transition, solubility etc. Phonons can be transported through chemical bonds or intermolecular interactions. Even though various functional groups may be present in a polymer, due to lack of an efficient thermal network, there may be significant phonon scattering due to randomly arranged polymer chains. PVA has its signature peak of hydroxyl absorption band in the range of 3400 to 3300 cm$^{-1}$ and C—H stretching peak at ~2908 cm$^{-1}$. This shift in the OH wave number is the indicator of the change in intermolecular interactions. FIG. 21(a) presents the shift in OH peak of PVA-XEG composite films at molar ratio of $3.25\times10^{-3}$. It can be seen from the figure that OH peak gradually shifts to higher wavenumber as the MW of bridging chain increases from DEG to HEG. Presence of XEG in PVA host matrix will lead to formation of new intermolecular interactions and thus affect the inter/intra hydrogen bonding present in PVA. Apart from forming intermolecular interactions, H-bonding also leads to confinement of bond rotation of polymer chain and better ordering in the lattice which are favorable to the phonon transport. Molecular interactions in PVA after incorporating XEG were further probed by studying their glass transition temperature. FIG. 21(b) describes the change of glass transition of PVA composites. The glass transition gradually decreases with the molecular weight (MW) of XEG. Here XEG acts as a plasticizer by penetrating the PVA chains and increases its chain mobility. Due to the presence of abundant hydroxyl group which leads to strong self-association between the PVA chains although random in nature, higher energy is required to make system transit from rubbery to glassy state. As mentioned before, the introduction of XEG in PVA leads to change in intermolecular interactions which correlates well with both shift in OH peak and glass transition temperature. It should be noted that strength of intermolecular interaction is one of many factors that can impact the transport ability of phonon in polymers although it doesn't necessarily lead to higher thermal conductivity. A bulk polymer may have strong intermolecular interaction but randomly arranged polymer chains which will lead to pronounced phonon scattering and low thermal conductivity. The presence of a continuous, homogenously distributed and scattering free thermal network within the polymer chain has major contribution to thermal conduction. Host polymer, thermal bridging chain's size and structure etc. can have significant influence on thermal conductivity.

PVA is semi-crystalline in nature and it has been suggested that both syndiotactic and isotactic units are randomly distributed in the crystallite. Crystallinity of PVA mainly originates from its strong intra molecular hydrogen bonding present in its lattice. PVA lattice has atactic structure with repeating monomer containing hydroxyl group with 50% occupancy. Pure PVA has an intense crystallization peak at 19.8°, which is the signature peak originated due to inter/intra hydrogen bonding in the polymer chains. In pure PVA, crystallites are randomly distributed in the amorphous matrix. Arrangement of crystallite in polymers can have significant influence on thermal conductivity. An ordered packing with continuous and homogenous thermal network can facilitate thermal conduction and vice-versa.

FIG. 22(a) presents the XRD of pure PVA and its composite with DEG, TEG and HEG. Crystalline peak at 19.8° was found to be gradually decreasing with the increase of molecular weight of bridging chain signifying the system is becoming more amorphous. Fixed Width at Half Maxima (FWHM) at the characteristic peak of PVA at 19.8° is presented in FIG. 22(b). FWHM gives the qualitative estimate of the crystallinity of system. Crystallinity and FWHM follow an inverse correlation. It can be seen from the figure that FWHM gradually increases with the increase of the chain length of bridging molecules and PVA polymer matrix becomes more amorphous. DEG and its counterparts suppress the crystallite formation of PVA which results in lowering of its crystallinity. A similar phenomenon was also seen with PVA when incorporated with different materials. DEG, TEG and HEG can be seen as destroying the inter/intra hydrogen bonding of the neat PVA and forming new interactions within polymer chain. FIG. 22(c) presents the change in the 2θ angle at the signature peak of PVA. The angle gradually lowers from 19.8° to 19.3° in case of pure PVA and PVA-HEG respectively. DEG, TEG and HEG have significant impacts on the lattice of pure PVA. Intra/inter hydrogen bonding in the neat PVA is rather random and don't contribute in enhancement of phonon transport. Bonding of DEG and others with PVA can induce ordered intermolecular interactions and can ultimately drive heat conductions in polymer chains by forming continuous thermal pathways in amorphous system.

Thermal conductivity as discussed before is generally believed to increase only by incorporating high thermally conductive fillers. These fillers have thermal conductivity which can be 100-500 times higher than the base matrix. In such composites, thermal conduction is usually governed by close packing between fillers and reduction of interfacial thermal resistance. In solid filler-polymer composites for enhanced thermal conduction, one of the major challenges is the significant phonon scattering at the interface. This inevitably comes due to great difference in properties of filler and base polymer. Composites of the present invention have reduced interface within polymer to greatly enhance thermal conduction and that could be exclusively driven by intermolecular interactions instead of solid-filler thermal pathways. Exploiting the ability of polymers to form intermolecular interaction, such thermal pathways were created using small organic molecules serving as thermal bridging chain.

FIG. 23 presents the thermal conductivity of constituent components and PVA composite films using organic molecules. Interesting, thermal conductivity of DEG which is used as a thermal bridging chain is even lower than the host matrix of PVA. As per rule of mixing, using the weight average means of thermal conductivity for each DEG and PVA, the effective value of composite comes less than 0.3 W/m·K (assuming 16% wt. loading of DEG). This number is even the higher limit, as in conventional polymer-filler systems the filler's thermal conductivity never translates into 100% of its weight in polymer composite due to pronounced phonon scattering. It is completely unexpected to find that organic molecules can be used to enhance thermal conductivity of composite. Interestingly, thermal conductivity of PVA-DEG presents a paradigm shift. DEG comes with poor thermal conductivity which is even less than the base PVA matrix but the combined composite thermal conductivity is surprisingly increased. PVA-DEG thermal conductivity as presented in FIG. 23 shows thermal conductivity of PVA-DEG is around 2.6 times and 1.73 times the thermal conductivity of individual DEG and PVA respectively. This is a remarkable in terms of achieving a higher thermal conductivity even when the constituent component has lower thermal conductivity. It is believed that the decisive factor here is the intermolecular interaction between DEG and PVA chain and development of a continuous thermal network within polymer matrix. Another factor equally important is the reduced interfaces which are usually present in traditional polymer-filler composites. These interfaces can lead to massive phonon scattering and significantly decrease effective composite thermal conductivity many folds. PVA composites with different chain length of organic molecules to be employed as a connecting thermal bridge were studied. DEG, TEG and HEG with increasing size of chain length were used to further elucidate the intricacies of such interactions in PVA composite.

FIG. 24 indeed exhibits another interesting story. At PVA/XEG, mole ratio of $3.25 \times 10^{-3}$ thermal conductivity decreasing with increase in length of chain. PVA-DEG thermal conductivity gradually increases with increase in DEG loading from molar ratio of $1.18 \times 10^{-2}$ to $3.25 \times 10^{-3}$. The value of 0.52 W/m·K is achieved by PVA-DEG at the highest loading which is followed by PVA-TEG and PVA-HEG respectively. For PVA-TEG, the thermal conductivity has only miniscule improvement and remains constant over the range of molar ratio. Thermal conductivity of PVA-HEG shows minor increment in the first two loading and then take a sudden fall. The optimum loading of organic molecules is also important in the formation of continuous thermal network. As in the case of PVA-HEG, higher loading may disturb the thermal bridging network and can lead to chain agglomeration. This can be noticed in the optical transparency of the films where high loading of HEG make the films less transparent in comparison to DEG and TEG. The presence of homogenous distribution of thermal bridges in polymer matrix and quality of such bridges can greatly impact thermal conduction. Chain length of bridging chain can be seen to have significant influence over the thermal conductivity of PVA. As discussed before, intermolecular interaction can drive phonon transport in a hydrogen bonded polymer system. The phonon transport greatly depends on the quality of thermal linkages present between host polymer and thermal bridging chain. Since here, all the thermal bridging chain are of same family of material with same terminal groups, drastic impact of chain length can be seen. To improve the thermal conduction, a thermal bridging chain is required to facilitate thermal conduction. Linear thermal linkages with absence of any bulkier group at terminal end can more effectively facilitate thermal transport in bulk polymer. As can be seen from FIG. 24, the thermal conductivity of PVA-DEG at $3.25 \times 10^{-3}$ ratio is the highest and gradually decreases with the increase of bridging chain length. It can be understood that when phonon propagate from one polymer chain to another, it encounters inter-chain thermal resistance. When shorter thermal bridging chains are used, phonon can transport more effectively across chains than if longer chains are used.

Studies of the present invention demonstrate a relationship between crystallinity and thermal conductivity. It was found that PVA matrix becomes more amorphous than its neat state by the incorporation of these organic molecules while the thermal conductivity increases. Comparison the crystallinity and thermal conductivity of PVA and PVA-XEG composites reveals an inverse correlation. To confirm that the system indeed becomes more amorphous while the thermal conductivity increases, XRD, DSC and mechanical testing were employed (FIG. 21(b), FIG. 22 and FIG. 29). Findings from all these three tests reveal that incorporation of DEG and other organic molecules in PVA leads to decrease in its crystallinity as compared to neat PVA. This is quite intriguing because in general thermal conductivity of a polymeric material is believed to be directly correlated to its crystallinity. PVA is a semi-crystalline polymer with strong self-association due to high hydroxyl group density throughout the polymer chain. This leads to its increased crystallinity. Its thermal conductivity contribution is mainly due to its crystallinity and its packing of polymer chains in certain order. The self-association of PVA can be thought to be devoid of continuous thermal network through hydrogen bonding as evident from its low thermal conductivity. DEG and similar molecule can be thought of destroying the self-association and lead to new interactions as revealed from FTIR. These new interactions essentially drive thermal conduction. As discussed before, PVA crystallite are randomly arranged and only limited contribution in thermal conductivity could be achieved through such system. To further push the limits, re-structuring of polymer chain is required which here is achieved by hydrogen bonding interaction between DEG and PVA. DEG effectively functions as a "thermal bridge" to facilitate inter-chain phonon transport in PVA. These bridges mainly formed by hydrogen bonds between DEG and PVA drives phonon transport throughout the polymer matrix. In neat polymer, due to massive phonon scattering, thermal conductivity is very poor. Incorporating such thermal bridges are effective in carrying phonon without being scattered. This strategy therefore provides an efficient at the same time, a flexible handle in engineering intermolecular interaction within the polymer chains to drive phonons.

To further elucidate the chain length impact, comparison can be made to the composites containing significantly larger molecular weight polymers like PEG 200K. This study positively correlates and reinforces the assumption of the significant influence of chain length of thermal bridges in driving phonon across polymer chains. FIG. 25 presents the thermal conductivity of PVA composite films by varying the molecular weight of thermal bridging chains of PEG from 200 to 400 Kg/mol. It was further compared with DEG which is the smallest among all. PVA-PEG (200K) film has the lowest thermal conductivity which gradually increases with the decrease in molecular weight. The thermal conductivity of PVA-DEG has the highest among all. Such a system can be seen analogous to a current-resistance circuit where increasing the resistance lead to lower current across two points. As discussed, interchain thermal resistance can play a dominant role in thermal conduction and here it is clearly revealed that small bridging chain are more effective and efficient in driving thermal transport in polymer chain. Such phonons are mainly driven by the intermolecular interactions that are present between DEG and PVA. The terminal OH of DEG and OH of PVA can from short linear thermal linkages which in turn facilitate the enhanced thermal conductivity. Moreover, the presence of DEG can also lead to structural re-ordering of PVA chains to further expedite phonon transport. Schematic shown in FIG. 26 describes the impact of thermal bridging chain length on the thermal conductivity of composite films. Thermal conductivity increases from HEG to DEG (A) to (C), as the bridging chain size becomes shorter due to the decrement in the inter-chain thermal resistance for phonon propagation. DEG and other molecules provide a thermal connection between PVA chains such that phonon can easily transport via these organic molecules which act as a thermal bridging chain. Although thermal conductivity of these organic molecules is low but when incorporated in polymer matrix lead to enhancement due to good thermal network formed by hydrogen bonding which facilitate ease of phonon transport across chains.

Thermal conductivity of PVA composite films with various terminal functional groups may be employed to form a thermal bridging chain. The best thermal conductivity among PVA composites with DEG, TEG and HEG was PVA-DEG which consists of five-atom chain length between terminal groups. PVA composite films were further prepared with size of the thermal bridging chain equivalent to DEG but with different functional groups at the terminal position. 1,5-pentanediol (PDiol), glutaric acid (GA) and 2,4-pentanedione (PDione) consisting of —OH, —COOH, and C=O terminal groups were studied and quite drastic contrast in thermal conductivity was noted. DEG and PDiol show capability to form linear thermal linkages due to small hydroxyl groups at terminal position, while GA has a slightly bulkier carboxylic group. PDione has carbonyls groups not present at terminal ends, but rather at side positons. Relatively, PDione is the one with least ease to form linear thermal linkages. Thermal conductivity of all the PVA composite films with various functional groups at terminal position is presented in FIG. 27. PVA due to the presence of abundance hydroxyl groups can form intermolecular interaction with various functional groups. Size and shape of thermal bridging chain can significantly impact the ability for phonon propagation. It is interesting to note that thermal conductivity gradually decreases from DEG to PDione. This supports the concept of ease of linear thermal linkages required for phonon transport across the thermal bridging chain. DEG has advantage over PDiol due to its better ability in reconstructing PVA chain with enhanced ordering which is favorable for increased thermal conductivity. GA has bulkier terminal groups as compared to DEG and PDiol which resulted in its lower thermal conductivity. PDione is diketone and can co-exist in two form keto and enol also known as tautomers. The keto form is more favorable in polar solvent like water and vice-versa. PVA-PDione can have both the forms present in aqueous solvent and may impact its properties differently as compared to its counterpart of DEG, PDiol and GA. The presence of carbonyl group at the side position rather than terminal one in PDione can offer steric hindrance to the formation of linear thermal linkages while transport of phonon which in-turn impacts its thermal conductivity. From thermal conductivity values, it's evident that molecular structure of organic molecules going to be employed as thermal bridging chain can have significant impact on overall thermal conductivity of composites. Thus size of bridging chain, its structure and functional group, all can be thought of substantially controlling the phonon transport across polymer chains.

The XRD of all PVA composite having different functional groups is presented in FIG. 28. As can be seen the characteristic signature peak of PVA composite films at around 19.5° gradually decrease from DEG to GA and then increase in case of PDione. FIG. 28(b) gives the FWHM of this crystallite peak. FWHM increases from DEG to GA and then decreases which signifies that amorphous character of PVA composite films increase to GA and then take a dip. In comparison to pure PVA, all the films are more amorphous which means that the crystallite of pure PVA was suppressed by the incorporation of these organic molecules. Decrease of PVA crystallinity, due to the addition of organic molecules shows disruption of random self-association of inter/intra hydrogen bonding and generation of new interactions. As discussed previously, in pure PVA crystallite is randomly distribution in the amorphous part and the thermal conductivity of such system is very low. FIG. 28(b) further describes the change in OH peak position of different PVA composite films. As aforementioned, change in OH peak position signifies the change in intermolecular interaction between organic molecules and host matrix which is one of potential factor to drive phonons. Such interactions can be greatly varied upon the structure and functional group of the thermal bridging chain. Here interestingly, FWHM and OH peak shift follows a similar trend as shown in FIG. 28(b).

FIG. 29 presents the modulus of elasticity (MoE) of all PVA composite films at molar ratio of $3.25 \times 10^{-3}$. Pure PVA has the highest modulus owing to rigid and stiff chains. MoE of PVA-XEG films are reduced almost three times than Pure PVA. PVA-XEG composite films (FIG. 29a) have comparable MoE and no significant trend was observed with change of molecular weight. However, the PVA composite films with different terminal groups (FIG. 29(b)) follows an increasing trend which is inversely proportional to the thermal conductivity. MoE of PVA-DEG was found to be 1.8 GPa which increases to 6.7 GPa in case of Pdione. MoE can be related to the stiffness of the films. MoE of pure PVA was found to be 7.2 GPa which is highest among all composite films. Due to the penetration of different organic molecules in the PVA matrix, the films become softer and less compact leading to decreased MoE. These foreign molecules can lead to increased sliding of polymer chain making them less compact. Generally, higher modulus is thought to be related to higher thermal conductivity which is not always true. Amorphous polymer system with enhanced intermolecular interactions can result in improved thermal conductivity although MoE may not increase proportionally. It should be understood that phonon transport in polymer is a rather a complex function and can be affected by many factors such as polymer structure, size, interfacial properties, segmental rotations, intermolecular interactions etc.

Intermolecular interaction has an impact on driving phonon transport in polymer chains. Thermal conductivity is enhanced primarily due to non-bonding interactions which are function of inter-chain distance rather than covalent bonds. Moreover, inter-chain heat transfer increases when polymer chains are connected through a short linker. Shorter intermolecular distance improves the interfacial heat flux. The molecular structure of the "thermal bridges" plays a role in determining heat flow. A short and linear thermal bridging chain drives phonon more efficiently than the hindered one.

As can be seen from FIG. 30, most of the films are optically transparent. Comparing he PVA-XEG composite films, optical transparency decreases with increasing molecular weight. PVA-DEG and PVA-TEG are quite clear compared to PVA-HEG which has some haziness. This can be related to the chain agglomeration of HEG molecule in the host PVA matrix. Among GA, Pdiol and Pdione, no significant different was found and films have good transparency.

Table 1 presents the thermal conductivity of various polymer-filler composites from past studies and their corresponding % variation from Rule of mixing (RoM) thermal conductivity. All the polymer composites have high negative values in range of −99 to −95%. This number shows a massive decrement of overall thermal conductivity of polymer composite from its constituent component. Especially, this negative number is evidence of extreme phonon scattering in polymer-filler systems which is one of the crucial bottleneck as to why the high thermal conductivity of fillers doesn't translate directly into the composite's thermal conductivity. This shows effective contribution of high thermally conductive filler is significantly low. On the other side of the coin, PVA-DEG shows a positive % variation of massive+83.10%, signifying even the lower thermally conductive material like DEG with only 0.2 W/m·K can greatly enhance the thermal conduction of base polymer, signifying an overall high effective contribution. Such materials essentially exploit the inherent thermal pathways of polymer like intermolecular interaction without creating additional interfaces which are significantly present in traditional polymer-filler system. Thus combination of both the factors intermolecular interactions and reduced interfaces expedite phonon transport within polymer chains.

TABLE 1

Comparison of Thermal conductivity and % deviation from RoM TC.

| Polymer-Filler | Matrix TC[a] | Filler TC[a,b] | Loading (wt. %) | Composite TC[a] | RoM[c] TC | % Variation[d] | Ref. |
|---|---|---|---|---|---|---|---|
| PVF-BNNTs | 0.18 | 330 | 10 | 0.45 | 33.2 | −98.64 | [13] |
| PVA-hBN | 0.18 | 330 | 15 | 0.8 | 49.7 | −98.39 | [65] |
| PI-funct.BN/Graphene | 0.13 | 750 | 50 | 2.11 | 375.1 | −99.44 | [66] |
| PA-funct. graphene | 0.285 | 750 | 5 | 0.41 | 37.8 | −98.91 | [67] |
| Epoxy-oriented 3D BN | 0.15 | 330 | 34 (vol) | 4.42 | 113.0 | −96.09 | [68] |
| Epoxy-SWNT/Graphite hybrid | 0.2 | 750 | 90 | 1.75 | 675.0 | −99.74 | [69] |
| PP-AlN | 0.113 | 160 | 25 (vol) | 0.638 | 40.1 | −98.41 | [70] |
| Silicon Rubber-Aligned BN | 0.15 | 330 | 31 (vol) | 5.47 | 102.4 | −94.66 | [71] |
| CNF-BNNTs | 0.034[e] | 330 | 40 | 4.71 | 132.0 | −96.43 | [72] |
| PVA-DEG | 0.3 | 0.2 | 16 | 0.52 | 0.3 | +83.10 | This work |

[a]Thermal conductivity (TC) reported here are all cross-plane values in W/m · K units.

[b]Thermal conductivity of all variants of Boron nitrides (modified/unmodified) is given a lower limit of 330 W/m · K and similarly for graphite/SWNT its 750 W/m · K C. Wang, J. Guo, L. Dong, A. Aiyiti, X. Xu, B. Li, "Superior thermal conductivity in suspended bilayer hexagonal boron nitride", Sci. Rep., 6(2016), 25334; Z. D. Han, A. Fina, "Thermal conductivity of carbon nanotubes and their polymer nanocomposites: A review", Prog. Polym. Sci., 36(2011), pp. 914-944; J. H. Seol, I. Jo, A. L. Moore, L. Lindsay, Z. H. Aitken, M. T. Pettes, X. Li, Z. Yao, R. Huang, D. Broido, N. Mingo, R. S. Ruoff, L. Shi, "Two-Dimensional Phonon Transport in Supported Graphene", Science, 328(2010), 213; D. L. Nika, E. P. Pokatilov, A. S. Askerov, A. A. Balandin, "Phonon thermal conduction in graphene: Role of Umklapp and edge roughness scattering", Phys. Rev. B, 79(2009), 155413.

[c]TC RoM (Rule of Mixing) is weighted or volume average mean of TC of polymer composite

[d]% Variation is calculated as [[Composite TC − RoM TC]/RoM TC] * 100

[e]From reference N. Song, S. Cui, X. Hou, P. Ding, L. Shi, "Significant Enhancement of Thermal Conductivity in Nanofibrillated Cellulose Films with Low Mass Fraction of Nanodiamond", ACS Appl. Mater. Interfaces, 9(2017), pp. 40766-40773.

Higher effective thermal conductivity has surprisingly been achieved by employing lower thermally conductive organic molecules and polymer matrix. This value was 180% higher than the thermal conductivity calculated from rule of mixing using thermal conductivities of individual component and polymer matrix. Phonon pathways were designed by engineering intermolecular interaction in host polymer by employing organic molecules with different sizes and functional groups. Thermally conductivity was probed in PVA composite film by varying molecular weight of thermal bridging chain and it was found that short polymer chains offer best thermal conductivity in contrast to longer ones. Diethylene glycol (DEG) when incorporated into base polymer matrix of polyvinyl alcohol (PVA) lead to remarkable thermal conductivity enhancement of 260% and 175% than DEG and neat PVA respectively at 16% wt. loading. The phonon transported was expedited when a short bridging chain was employed signifying the importance of interchain thermal resistance within bulk polymer. Keeping the chain length same, varying the functional group at terminal positions of the bridging chain also has an effect on TC. Remarkable difference in thermal conductivities was noticed by alternating terminal groups, signifying the importance of "quality of thermal linkages". Linear thermal linkages formed between host polymer and bridging chain resulted in higher thermal conductivity than one with hindered or bulkier linkages. PVA-DEG film thermal conductivity was higher than for its counterparts of TEG and HEG. The shorter chain may provide less inter-chain thermal resistance, and hence boost the phonon transport. After investigating the optimum chain length required for enhanced thermal conduction in the host polymer matrix, terminal functional groups of organic thermal bridging chains were varied while keeping the size same. Thermal conductivity decreases with decreasing ability to form linear thermal linkages and PVA-DEG was found to be of highest thermal conductivity and PVA-Pdione the lowest. In Pdione, the functional groups were not present at terminal end rather than at sides which possess more hindrance to its ability to form efficient thermal linear linkages and thus has the lowest thermal conductivity. The quality of linear thermal linkages was found to be important in governing phonon transport. There appears to be an inverse correlation between thermal conductivity and crystallinity of in this material.

General Characteristics of Polymer Composite

Advantageously, embodiments of the present invention provide polymers that are characterized by one or more of the following features: electrical insulation, optically transparent, light weight as compared to traditional polymer composite reinforced with fillers, ease of fabrication to various shapes and size, good flexibility and elongation— can be explored for flexible electronics, cost effective— expensive fillers are not required, corrosion resistance.

Thermal Conductivity

Thermal conductivity of the polymer composites may be measured by various methods, including laser flash method, transient plane source method, modified transient plane source method, differential scanning calorimetry (DSC), and others. In one or more embodiments, the thermal conductivity of a polymer composite of the present invention is greater than the thermal conductivity of the base linear, hydrophilic polymer. In one or more embodiments, the thermal conductivity of a polymer composite of the present invention is greater than the thermal conductivity of the organic additive. In one or more embodiments, the thermal conductivity of a polymer composite of the present invention is greater than the additive effect of the thermal conductivity of the base polymer and the organic additive.

In one or more embodiments, the thermal conductivity of a polymer composite of the present invention is at least about 0.2 W/m·K, in other embodiments, at least about 0.3 W/m·K, in other embodiments, at least about 0.4 W/m·K, in other embodiments, at least about 0.5 W/m·K, and in other embodiments, at least about 0.6 W/m·K, when measured according to ASTM D7984.

In one or more embodiments, the thermal conductivity of a polymer composite of the present invention is improved over the base polymer by a factor of at least 1.5 times, in other embodiments, by a factor of at least 2, in other embodiments, by a factor of at least 2.5.

Transparency

Transparency of the polymer composites may be measured by various methods, including by employing a UV-Vis spectrometer to measure transmittance at various wavelengths (nm). In one or more embodiments, the transmittance of a polymer composite of the present invention at 700 nm is at least about 70%, in other embodiments, at least about 75%, in other embodiments, at least about 80%.

Elongation

Elongation at break may be measured by various methods, including by ASTM D882. In one or more embodiments, the elongation at break may be measured at room temperature. Examples of equipment that may be employed to measure elongation at break include ADMET 500 universal testing machine (MTEST Quattro, USA). In one or more embodiments, polymer composites of the present invention have improved elongation at break, compared to the base polymer.

Crystallinity

In one or more embodiments, the polymer composites of the present invention have at least some crystalline character. Advantageously, intermolecular interactions between polymer chains and organic additive molecules may lead to the formation of discrete or continuous crystals. In one or more embodiments, the polymer composites include self-assembled crystals. In one or more embodiments, the polymer composites include discrete or continuous crystals.

Various modifications and alterations that do not depart from the scope and spirit of this invention will become apparent to those skilled in the art. This invention is not to be duly limited to the illustrative embodiments set forth herein.

What is claimed is:

1. A process for preparing a thermally conductive polymer composite, the method comprising the steps of:
   combining a linear, hydrophilic polymer and an organic, hydrophilic additive that includes at least two polar functional groups that are capable of forming hydrogen bonds, and
   blending to form a thermally conductive polymer composite, wherein the at least two functional groups may be the same or different, wherein the step of combining further includes the steps of dissolving the linear, hydrophilic polymer in a aqueous solvent, optionally at elevated temperatures, to form a polymer solution, dissolving the organic, hydrophilic additive in aqueous solvent to form an additive solution, and combining the polymer solution and additive, solution to form a mixture.

2. The process of claim 1, wherein intermolecular interactions between the polymer and additive lead to self-ordered crystallization within the polymer, composite.

3. The process of claim 1, wherein the linear, hydrophilic polymer is selected from the group consisting of polyvinyl alcohol, linear polysaccharides, polyamides, polyacrylic acids, polyacrylic amides, polyurethanes with polyethylene glycol ether soft segments, ethoxylated graft polymers, and the like, and combinations and copolymers thereof.

4. The process of claim 1, wherein the organic additive is selected from the group consisting of polyols, biopolymers, amino acids, aminoalcohols, dicarboxylic acids, and combinations thereof.

5. The process of claim 1, wherein the step of blending further comprises the steps of solvent casting the blend to form a plymer composite file.

6. A process for preparing a thermally conductive polymer composite, the method comprising the steps of:
   combining a linear, hydrophilic polymer and an organic, hydrophilic additive that includes at least two polar functional groups that are capable of forming hydrogen bonds, and
   blending to form a thermally conductive polymer composite, wherein the at least two functional groups may be the same or different, and wherein the organic additive is selected from the group consisting of polyalkylene glycols, biopolymers, amino acids, and aminoalcohols.

7. The process of claim 1, wherein the organic additive is a biopolymer.

8. The process of claim 7, wherein the biopolymer is gelatin or lignin.

9. The process, of claim 1, wherein the organic additive is an amino acid or an aminoalcohol.

* * * * *

UNITED STATES PATENT AND TRADEMARK OFFICE
CERTIFICATE OF CORRECTION

PATENT NO. : 10,870,749 B2  
APPLICATION NO. : 16/027736  
DATED : December 22, 2020  
INVENTOR(S) : Jiahua Zhu, Nitin Mehra and Liwen Mu Page 1 of 1

It is certified that error appears in the above-identified patent and that said Letters Patent is hereby corrected as shown below:

In the Claims

Column 26 Claim 1, Line 15, the "," after the word "additive" is deleted.
Column 26 Claim 2, Line 3, the "," after the word "polymer" is deleted.
Column 27 Claim 5, Line 3, the phrase "plymer composite file" is corrected to "polymer composite film"

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*